(12) United States Patent
Abotabl et al.

(10) Patent No.: US 11,888,786 B2
(45) Date of Patent: Jan. 30, 2024

(54) SWITCHING BETWEEN FLEXIBLE BANDWIDTH PARTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 17/512,387

(22) Filed: Oct. 27, 2021

(65) Prior Publication Data

US 2023/0125508 A1    Apr. 27, 2023

(51) Int. Cl.
*H04L 5/00* (2006.01)
*H04W 72/044* (2023.01)
*H04W 72/23* (2023.01)

(52) U.S. Cl.
CPC ......... *H04L 5/0096* (2013.01); *H04W 72/044* (2013.01); *H04W 72/23* (2023.01)

(58) Field of Classification Search
CPC .. H04W 72/044; H04W 72/23; H04L 5/0096; H04L 5/0092; H04L 5/0098; H04L 5/001; H04L 5/0053
See application file for complete search history.

(56) References Cited

U.S. PATENT DOCUMENTS

2019/0149380 A1    5/2019 Babaei et al.
2020/0344018 A1*  10/2020 Takeda ................... H04W 88/06
(Continued)

FOREIGN PATENT DOCUMENTS

EP    3567789    11/2019
EP    3737056    11/2020

OTHER PUBLICATIONS

International Search Report and Written Opinion dated Jan. 19, 2023 from corresponding PCT Application No. PCT/US2022/077029.
(Continued)

*Primary Examiner* — Maharishi V Khirodhar
*Assistant Examiner* — Kenneth P Hunt
(74) *Attorney, Agent, or Firm* — QUALCOMM Incorporated

(57) ABSTRACT

Aspects are provided which allow a base station to configure flexible BWPs that include a dedicated slot format or may be applied in both DL and UL symbols, and which allow a UE to switch between flexible BWPs in frequency and/or time. The base station configures a first BWP and a second BWP. The first BWP is associated with a first bandwidth and a first slot format dedicated for the first BWP. The base station transmits, to a UE, a configuration to switch the first BWP to the second BWP. The UE receives the configuration from the base station and switches the first BWP to the second BWP. In particular, the UE may switch the first bandwidth to a second bandwidth, the first slot format to a second slot format, or both the first bandwidth and first slot format to the second bandwidth and second slot format, respectively.

25 Claims, 15 Drawing Sheets

(56) References Cited

U.S. PATENT DOCUMENTS

2021/0099902 A1* 4/2021 Takeda .................. H04W 24/10
2021/0377812 A1* 12/2021 Zhou ..................... H04W 72/23

OTHER PUBLICATIONS

Samsung: "On Bandwidth Part Operation", 3GPP Draft; R1-1716019, 3rd Generation Partnership Project (3GPP), Mobile Competence Centre; 650, Route Des Lucioles; F-06921 Sophia-Antipolis Cedex ; France; vol. RAN WG1, No. Nagoya, Japan; Sep. 18, 2017-Sep. 21, 2017, Sep. 17, 2017 (Sep. 17, 2017), XP051339478, Retrieved from the Internet: URL:http://www.3gpp.org/ftp/Meetings_3GPP_SYNC/RAN1/Docs/ [retrieved on Sep. 17, 2017].

* cited by examiner

SWITCHING BETWEEN FLEXIBLE BANDWIDTH PARTS

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives, from a base station, a configuration of a first bandwidth part (BWP) and a second BWP, where the first BWP is associated with a first bandwidth and a first slot format dedicated for the first BWP. The UE switches the first BWP to the second BWP, where: the first bandwidth is switched to a second bandwidth, the first slot format is switched to a second slot format, or the first bandwidth is switched to the second bandwidth and the first slot format is switched to the second slot format.

In an aspect of the disclosure, a method, a computer-readable medium, and an apparatus are provided. The apparatus may be a base station. The base station configures a first BWP and a second BWP, where the first BWP is associated with a first bandwidth and a first slot format dedicated for the first BWP. The base station transmits, to a UE, a configuration to switch the first BWP to the second BWP, where the configuration indicates: the first bandwidth is to be switched to a second bandwidth, the first slot format is to be switched to a second slot format, or the first bandwidth is to be switched to the second bandwidth and the first slot format is to be switched to the second slot format.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
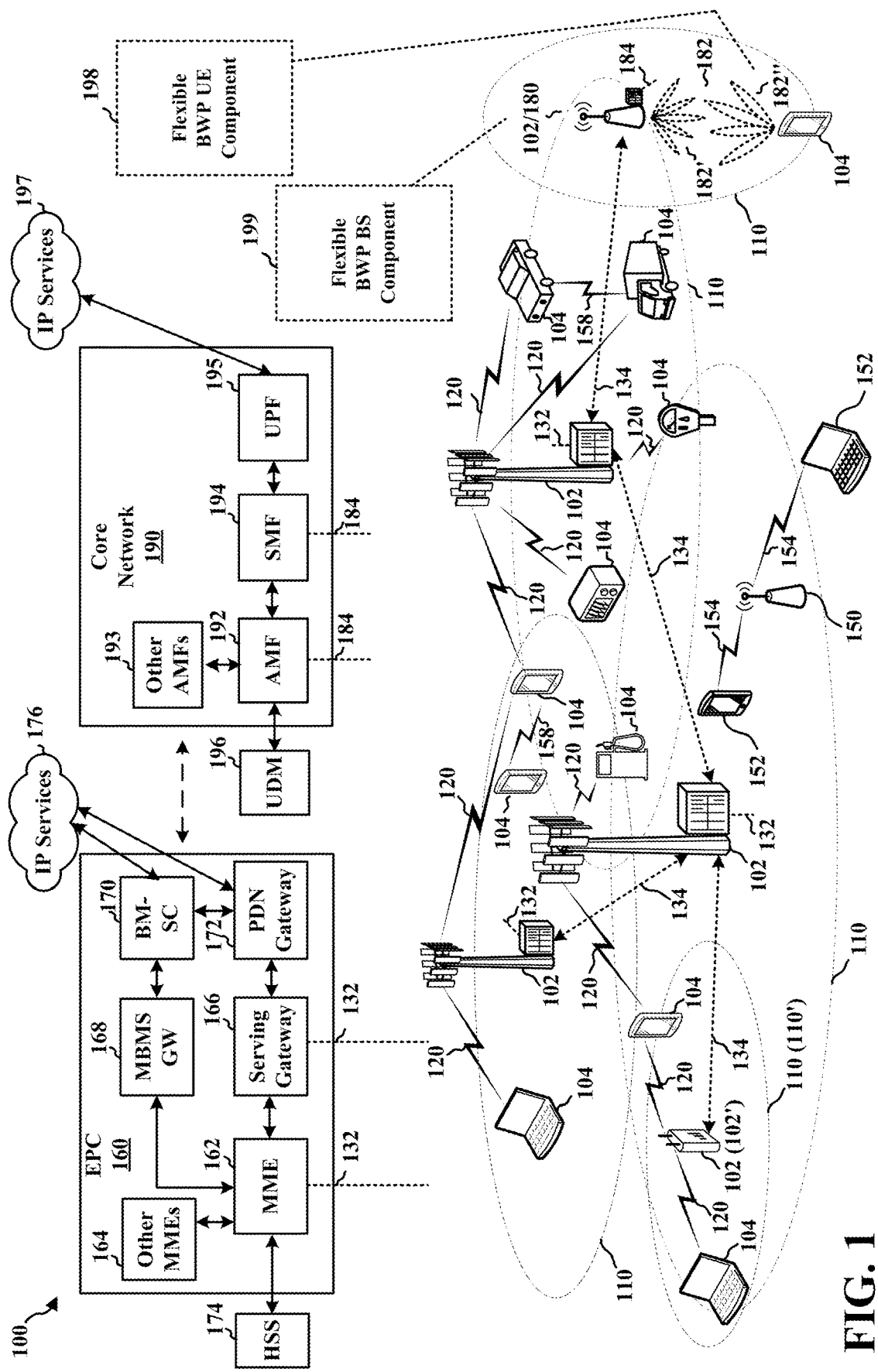
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, a BWP is a contiguous set of physical resource blocks (PRBs) for a given numerology on a given carrier. BWPs facilitate power-efficient communication between a base station and a UE on the given carrier or band. For instance, a base station may assign resources specifically within an active BWP for a UE (as opposed to broadly within PRBs of the entire band), and the UE may search for data or signaling from the base station in the active BWP rather than within PRBs of the entire band.

A base station and UE may switch BWPs. Switching BWPs involves activating a configured (de-activated) BWP and de-activating an active BWP. When switching BWPs, the base station and UE may switch between downlink (DL) BWPs and between uplink (UL) BWPs simultaneously in time division duplex (TDD) deployments and independently in frequency division duplex (FDD) deployments. Moreover, in TDD deployments, the base station may provide a common or dedicated slot format configuration to the UE indicating which symbols of a slot are downlink or uplink, and the activated DL BWP or UL BWP may be applied in DL or UL symbols accordingly.

TDD deployments and FDD deployments may be half-duplex or full-duplex. In half-duplex communication, a base station or UE may transmit and receive data at different times, but not at the same time. In contrast, in full-duplex communication, a base station or UE may transmit and receive data at the same time. One example of full-duplex communication is in-band full duplex (IBFD), in which a base station or UE may transmit and receive data in at least part of (or all of) the same frequency resource(s). Another example of full-duplex communication is sub-band FDD (also referred to as flexible duplex), in which a base station or UE may transmit and receive data in different frequency resources.

Conventional BWPs inflexibly follow the timing of a slot format configuration for the cell or a UE. For instance, in TDD deployments, if a base station configures a common or dedicated slot format to include specified DL and UL symbols at different times, the base station and UE may conventionally apply only a DL BWP during the DL symbols and only an UL BWP during the UL symbols. In contrast, the base station and UE may not apply a single BWP for both DL and UL symbols. While this inflexibility in conventional BWPs may suffice with respect to half duplex communication, this inflexibility may interfere with full duplex communication. For instance, if a DL BWP and UL BWP are separately activated according to a timing of a TDD slot format configuration, the DL BWP and the UL BWP may not be activated at the same time for full duplexing. As a result, the base station and UE may not be able to apply such BWPs for full duplexing. Therefore, it would be helpful to provide more flexible BWPs with respect to timing, rather than the conventional BWPs which inflexibly follow a cell or UE slot format, in order to facilitate full-duplex operation.

Accordingly, aspects of the present disclosure provide a BWP which may more flexibly include a dedicated slot format for that BWP or which may otherwise be applied in both DL and UL symbols. Such BWPs are referred to throughout this disclosure as "flexible BWPs". Moreover, aspects of the present disclosure provide various approaches for switching between flexible BWPs in frequency and/or time.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace. RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a flexible BWP UE component 198 that is configured to receive, from a base station, a configuration of a first BWP and a second BWP, where the first BWP is associated with a first bandwidth and a first slot format dedicated for the first BWP, and to switch the first BWP to the second BWP, where: the first bandwidth is switched to a second bandwidth, the first slot format is switched to a second slot format, or the first bandwidth is switched to the second bandwidth and the first slot format is switched to the second slot format.

Referring again to FIG. 1, in certain aspects, the base station 102, 180 may include a flexible BWP BS component 199 that is configured to configure a first BWP and a second BWP, where the first BWP is associated with a first bandwidth and a first slot format dedicated for the first BWP, and to transmit, to a UE, a configuration to switch the first BWP to the second BWP, where the configuration indicates: the first bandwidth is to be switched to a second bandwidth, the first slot format is to be switched to a second slot format, or the first bandwidth is to be switched to the second bandwidth and the first slot format is to be switched to the second slot format.

Figure 2:
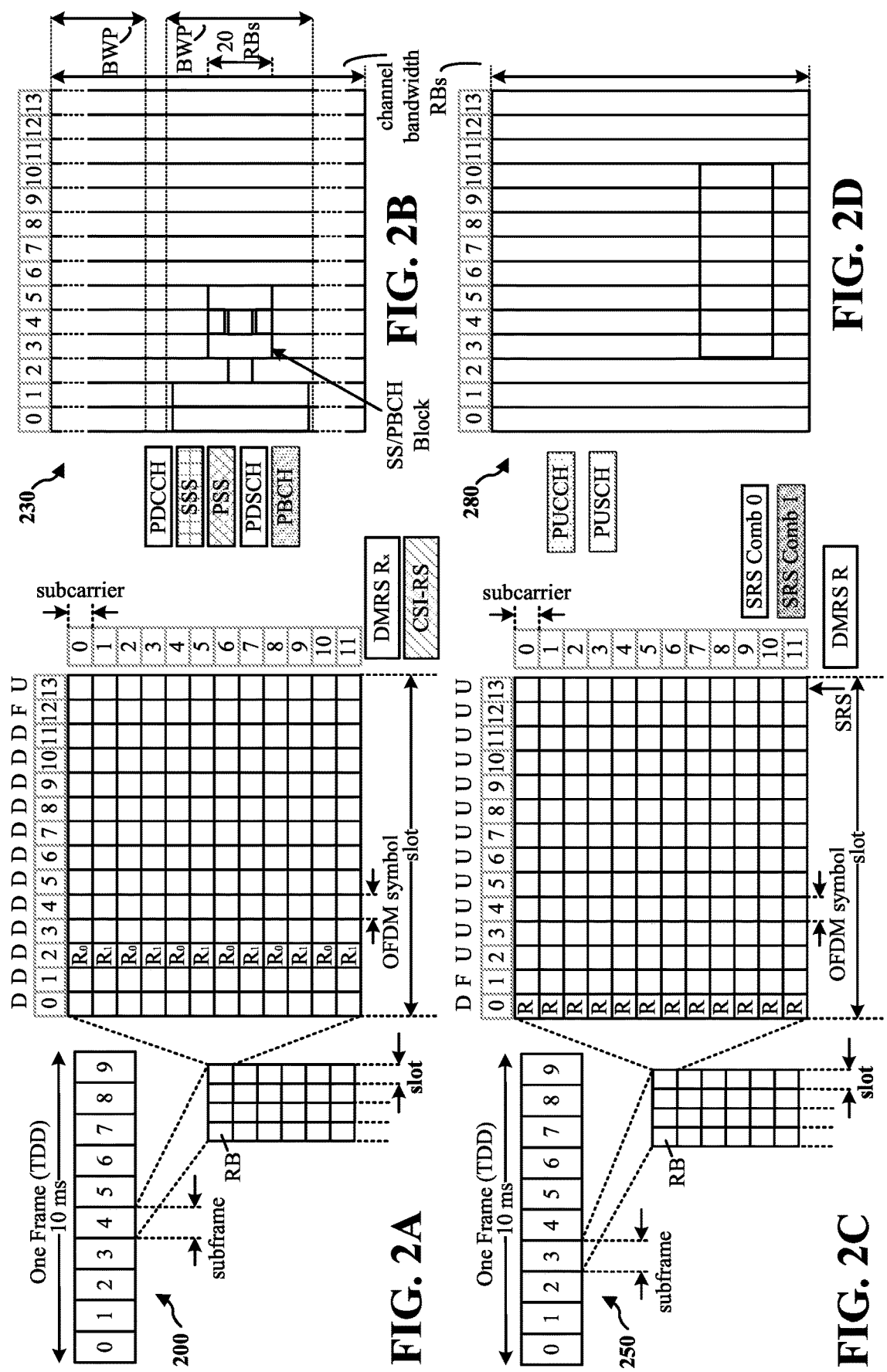
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
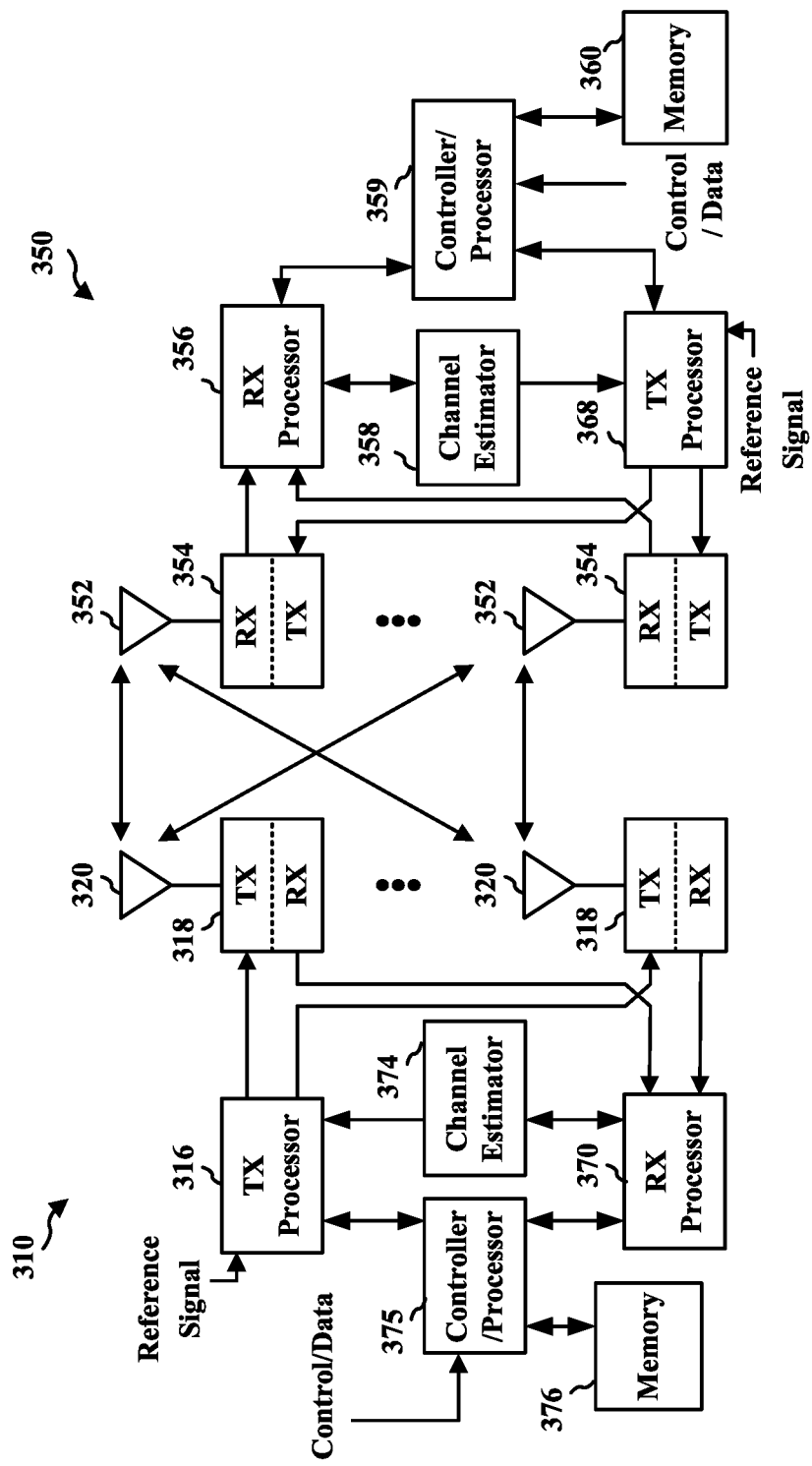
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with flexible BWP UE component 198 of FIG. 1.

At least one of the TX processor 316, the RX processor 370, and the controller/processor 375 may be configured to perform aspects in connection with flexible BWP BS component 199 of FIG. 1.

Generally, a bandwidth part (BWP) is a contiguous set of physical resource blocks (PRBs) for a given numerology on a given carrier. BWPs facilitate power-efficient communication between a base station and a UE on the given carrier or band. For instance, a base station may assign resources specifically within an active BWP for a UE (as opposed to broadly within PRBs of the entire band), and the UE may search for data or signaling from the base station in the active BWP rather than within PRBs of the entire band.

The base station may provide a radio resource control (RRC) configuration to a UE, such as a RRC reconfiguration, which may configure uplink (UL) and downlink (DL) BWPs with various parameters. These RRC parameters may include, for example, a BWP identifier or index for each BWP, a location and number of contiguous PRBs in frequency for each BWP, a subcarrier spacing for each BWP, and a cyclic prefix for each BWP. Moreover, the RRC configuration may indicate an initial downlink BWP for initial downlink transmissions (e.g., a control resource set (CORESET) #0), an initial uplink BWP for initial uplink transmissions (e.g., following reconfiguration or activation of a cell), a BWP inactivity timer (e.g., a timer which may increment by 0.5 or 1 ms depending on frequency range each period that a DCI is not received), a default downlink BWP (e.g., a DL BWP to which the base station and UE may switch in response to expiration of the BWP inactivity timer), a first active downlink BWP for downlink transmissions (e.g., following reconfiguration or activation of a cell), and a first active uplink BWP for uplink transmission (e.g., following reconfiguration or activation of a cell). Generally, a base station may configure up to four DL BWPs and up to four UL BWPs for a UE, of which only 1 BWP may be active in a UL or DL direction at a given time.

A base station and UE may switch BWPs. Switching BWPs involves activating a configured (de-activated) BWP and de-activating an active BWP. In one approach, the base station may provide a DCI including a bandwidth part indicator field indicating a BWP index, and the UE may switch to an active BWP corresponding to the indicated BWP index in response to the DCI. The DCI may be for a downlink assignment or an uplink grant. For instance, the base station may configure the DCI to indicate a BWP index corresponding to a configured UL BWP or DL BWP, and if the indicated BWP index is different than that of a current active BWP, the UE may switch to the corresponding UL or DL BWP. In another approach, the base station and UE may switch to an active BWP, namely, a configured default downlink BWP, in response to expiration of a configured BWP inactivity timer. For instance, if an RRC configuration indicates a configured DL BWP as the default downlink BWP, and if a DCI indicating a downlink assignment or uplink grant is not received at the UE within the time indicated by the BWP inactivity timer, the base station and UE may switch to the default DL BWP. In a further approach, the base station and UE may switch to an active BWP in response to RRC signaling. For instance, if an RRC configuration indicates a configured DL BWP as a first active DL BWP or a configured UL BWP as a first active UL BWP, then upon reconfiguration or activation of a serving cell, the base station and UE may switch to the indicated first active DL BWP or the indicated first active UL BWP. In an additional approach, the medium access control (MAC) element of the UE may itself switch to an active BWP upon initiation of a random access procedure.

In any of the aforementioned BWP switching approaches, the base station and UE may switch DL BWPs and UL BWPs simultaneously in time division duplex (TDD) deployments and independently in frequency division duplex (FDD) deployments. For example, in a TDD deployment, DL and UL BWPs may be switched together (e.g., if a DL BWP is switched, then a UL BWP may also be switched). On the other hand, in a FDD deployment, DL BWP and UL BWPs may be switched separately (e.g., in response to different occurrences of BWP switching).

In TDD deployments, the base station may provide a slot format configuration to the UE indicating which symbols of a slot are downlink, uplink, or flexible (used for either uplink or downlink communications). The base station may provide the slot format configuration, for example, in a system information block (e.g., SIB1), an RRC reconfiguration, or a DCI. The slot format configuration may also be a common TDD configuration for a cell, or a dedicated TDD configuration for a UE.

Figure 4:
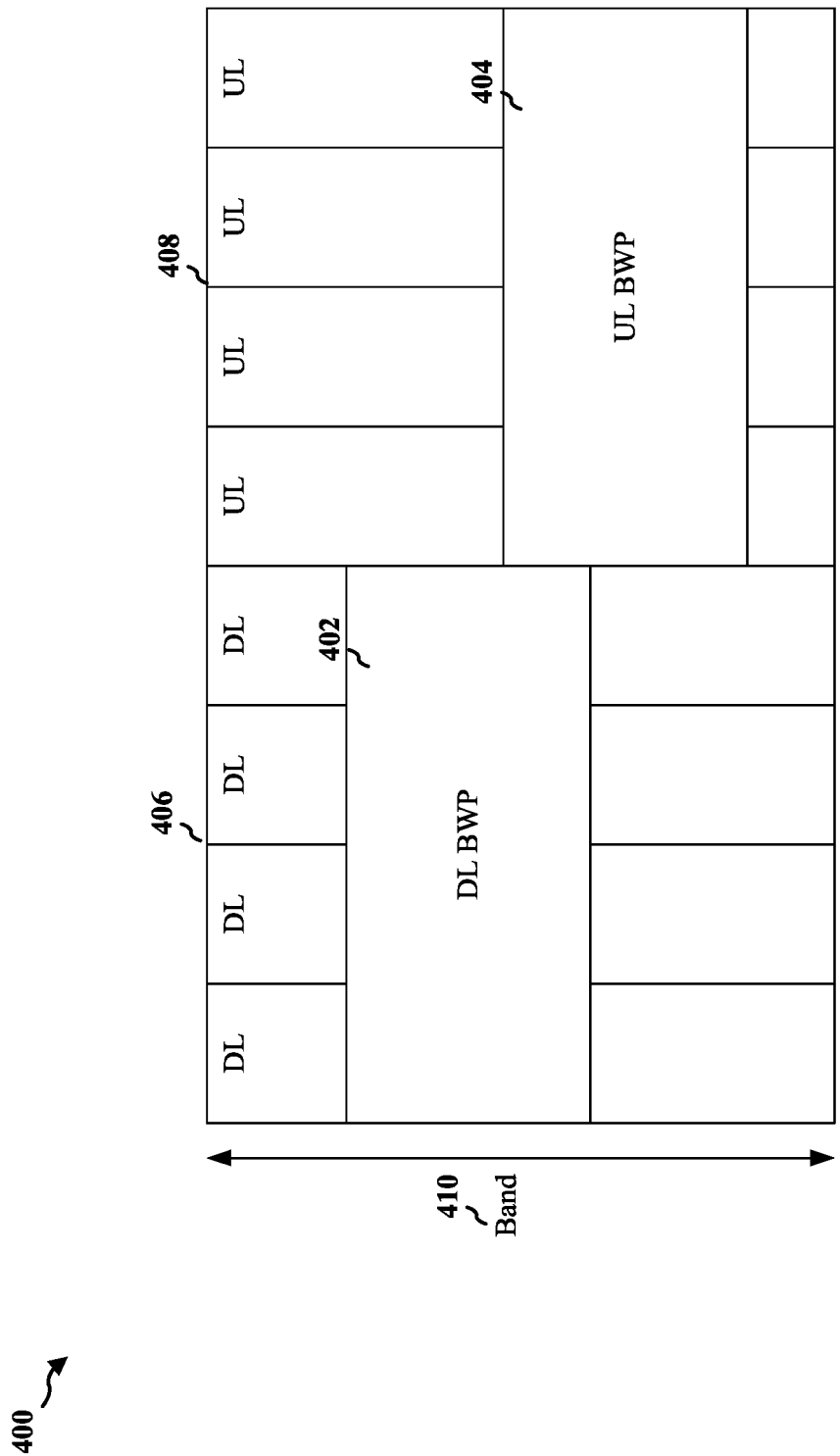
FIG. 4 is a diagram illustrating an example of half-duplexing in which a base station configures a DL BWP and an UL BWP at different times.

TDD deployments and FDD deployments may be half-duplex or full-duplex. In half-duplex communication, a base station or UE may transmit and receive data at different times, but not at the same time. For instance, FIG. 4 illustrates an example 400 of half-duplexing in which the base station configures a DL BWP 402 and an UL BWP 404 respectively occupying a plurality of DL symbols 406 and a plurality of UL symbols 408 in a band 410 at different times. Thus, a DL BWP and UL BWP may respectively occupy different symbols of a band in half-duplex communication. The base station may configure the UE with the DL BWP 402 and UL BWP 404 in a RRC configuration such as previously described, and the base station may configure the DL symbols 406 and UL symbols 408 to occur in TDD according to a slot format configuration for the cell or UE such as previously described. The DL BWP may be active during the DL symbols, and the UL BWP may be active during the UL symbols.

Figure 5:
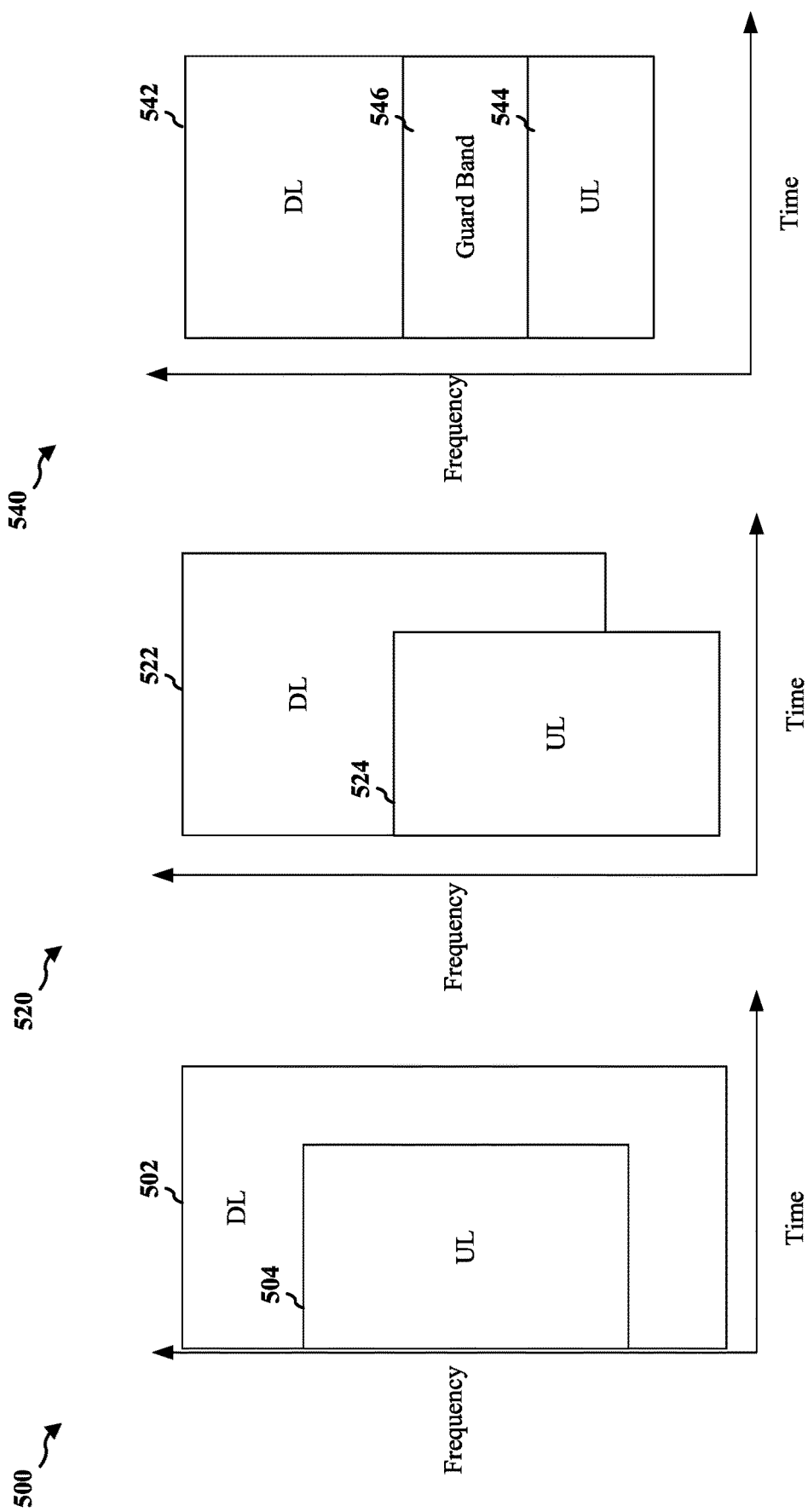
FIGS. 5A-5C are diagrams illustrating different examples of full-duplexing in which a UE may receive and transmit data to a base station at the same time.

In contrast, in full-duplex communication, a base station or UE may transmit and receive data at the same time. One example of full-duplex communication is in-band full duplex (IBFD), in which a base station or UE may transmit and receive data in at least part of (or all of) the same frequency resource(s). For instance, FIG. 5A illustrates an example 500 of IBFD in which a DL BWP 502 fully overlaps in frequency with an UL BWP 504, and FIG. 5B illustrates an example 520 of IBFD in which a DL BWP 522 partially overlaps in frequency with an UL BWP 524. Thus, a DL BWP and an UL BWP may share identical time-frequency resources with either full or partial frequency overlap in IBFD communication. Another example of full-duplex communication is sub-band FDD (also referred to as flexible duplex), in which a base station or UE may transmit and receive data in different frequency resources. For instance, FIG. 5C illustrates an example 540 of sub-band FDD full duplexing in which a DL BWP 542 and an UL BWP 544 simultaneously occupy different frequency resources separated by a guard band 546 (e.g., 10-20 RBs or some other relatively small number of RBs). Thus, a DL BWP and an UL BWP may overlap in time but not in frequency in sub-band FDD, and the frequency resources for uplink communication may be separated from the frequency resources for downlink communication by a guard band.

Conventional BWPs inflexibly follow the timing of a slot format configuration for the cell or a UE. For instance, in TDD deployments, if a base station configures a common or dedicated slot format to include specified DL and UL symbols at different times such as previously described, the base station and UE may conventionally apply only a DL BWP during the DL symbols and only an UL BWP during the UL symbols. In contrast, the base station and UE may not apply a single BWP for both DL and UL symbols (e.g., a DL BWP for UL symbols, or an UL BWP for DL symbols). For example, referring to FIG. 4, only DL BWP 402 may be active in DL symbols 406 and only UL BWP 404 may be active in UL symbols 408. Similarly, in FDD deployments, the base station and UE may conventionally apply a DL BWP during DL symbols and an UL BWP during UL symbols, but the base station and UE may not apply the same BWP for DL and UL symbols. Thus, the application of conventional BWPs is inflexibly limited to the slot format of the cell or UE.

While this inflexibility in conventional BWPs may suffice with respect to half duplex communication, this inflexibility may interfere with full duplex communication. For instance, if a DL BWP and an UL BWP are activated separately based on a timing of a slot format for a cell or UE as previously described, the DL BWP and the UL BWP may not conventionally be activated at the same time for simultaneous transmission and reception of data in full duplexing. For example, referring to FIGS. 4 and 5A-5C, the base station and UE may not activate DL BWP 502, 522, 542 during the UL symbols 408 indicated in the cell or UE slot format, nor UL BWP 504, 524, 544 during the DL symbols 406 indicated in the cell or UE slot format. As a result, the base station and UE may not be able to apply conventional BWPs for full duplexing. Therefore, it would be helpful to provide more flexible BWPs with respect to timing (rather than merely BWPs which inflexibly follow a cell or UE slot format) in order to facilitate full-duplex operation.

Figure 6:
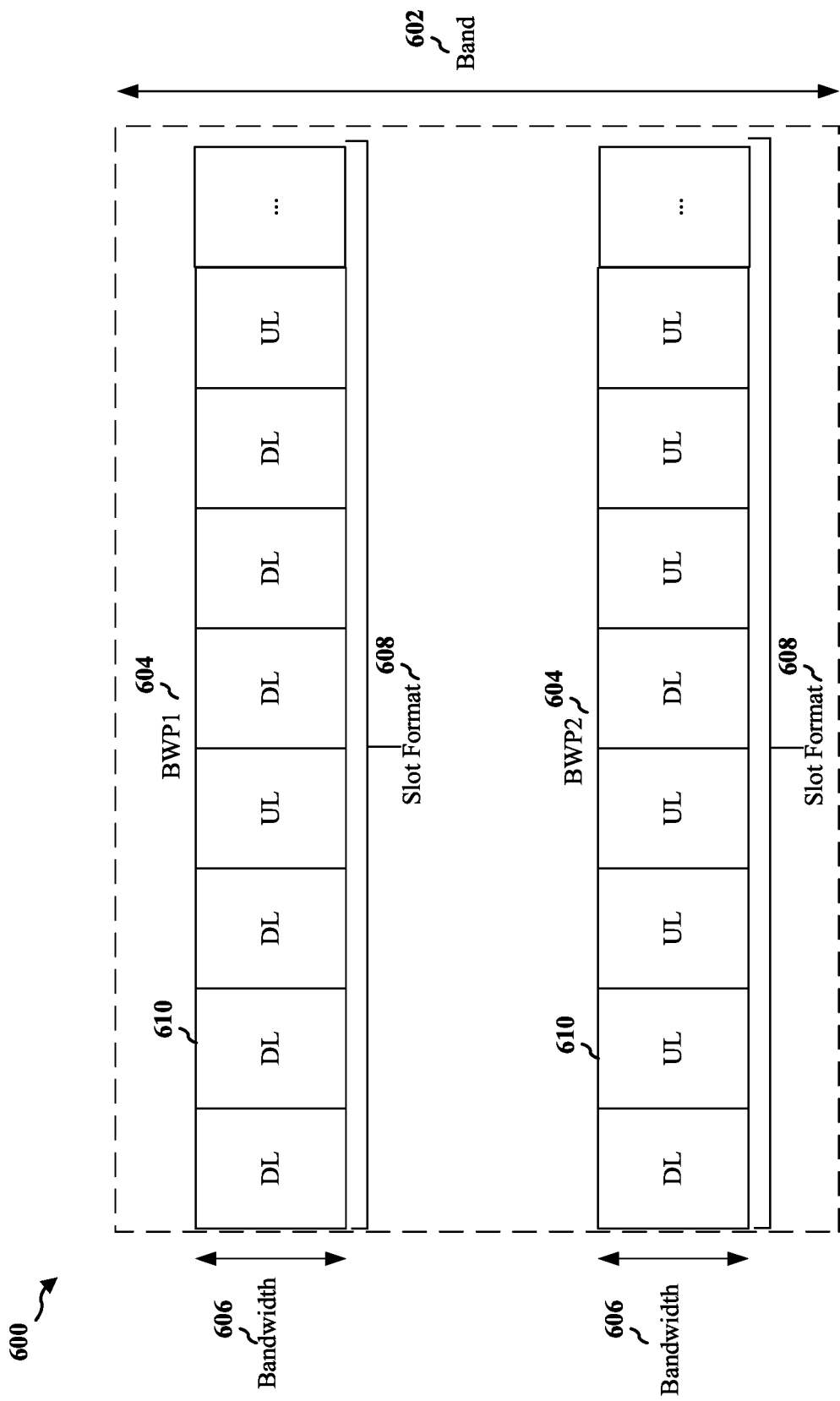
FIG. 6 is a diagram illustrating an example of a band including flexible BWPs.

Accordingly, aspects of the present disclosure provide a BWP which may more flexibly include a dedicated slot format for that BWP or which may otherwise be applied in both DL and UL symbols. Such BWPs are referred to throughout this disclosure as "flexible BWPs". For instance, FIG. 6 illustrates an example 600 of a band 602 including flexible BWPs 604, where each flexible BWP is associated with a bandwidth 606 (e.g., a location and number of contiguous PRBs) and a slot format 608 (e.g., a pattern of DL, UL, and in some cases flexible symbols). In this example, BWP1 may be configured with one slot format including a repeating pattern of symbols 610 DL/DL/DL/UL, and BWP2 may be configured with another slot format including a repeating pattern of symbols 610 DL/UL/UL/UL, although the slot formats may be the same or different from those illustrated in other examples. Moreover, although BWP1 and BWP2 in the illustrated example of FIG. 6 have the same number of contiguous PRBs (e.g., in bandwidth 606), the number of PRBs in each BWP may be different in other examples.

The base station may configure flexible BWPs in an RRC configuration, such as an RRC reconfiguration as described above for conventional BWPs. For example, in addition to configuring conventional BWP parameters in the RRC configuration, the base station may include a bit or other indicator associated with a BWP index indicating whether the corresponding BWP is flexible (or conventional), and if the BWP is flexible, the base station may configure a dedicated slot format for the BWP in that RRC configuration. In some cases, the base station may not configure a dedicated slot format for a flexible BWP, but rather allow the BWP to take a dedicated slot format of another flexible BWP during BWP switching, such as described in more detail below.

Flexible BWPs may enable or facilitate full-duplex operation. For instance, a base station and UE may activate multiple flexible BWPs in a band with different slot formats (e.g., BWP1 and BWP2 in FIG. 6) such that one active BWP includes at least one DL symbol at the same time that another active BWP includes at least one UL symbol (e.g., symbols 610 in BWP1 and BWP2 of FIG. 6), thereby allowing the base station and UE to communicate in full-duplex within those symbol(s). Moreover, flexible BWPs may add more flexibility to network assignments and allow for simultaneous handling of half-duplex UEs, full-duplex UEs, and full-duplex aware UEs (e.g., half-duplex UEs which are capable of full-duplex communication with the base station). Additionally, flexible BWPs may be widely applicable not only to full-duplex communication, but also to half-duplex communication (e.g., dynamic TDD deployments), as well as in both TDD and FDD deployments.

Generally, conventional BWPs are each associated with a bandwidth (e.g., a location and number of contiguous PRBs in frequency for each BWP as configured in an RRC reconfiguration such as described above), but not a slot format since such BWPs already inflexibly follow a configured slot format of a cell or UE. Therefore, conventional approaches to BWP switching such as described above generally relate to a change in BWP in the frequency domain only. However, in flexible BWPs which may also include a dedicated slot format, the conventional approaches to BWP switching may not be sufficient, since these approaches do not address changes which could be made in BWPs in the time domain only (e.g., in slot format but not in bandwidth), or in both the time domain and frequency domain (e.g., in slot format as well as bandwidth). Thus, it would be helpful to provide various approaches for flexible BWP switching (e.g., which may address BWP changes in time and/or frequency domains). Accordingly, aspects of the present disclosure provide various approaches for switching between flexible BWPs in frequency and/or time.

In one example, a flexible BWP (e.g., flexible BWP 604) may include a bandwidth (e.g., bandwidth 606) and one or more dedicated slot formats (e.g., slot format 608). Different flexible BWPs (associated with different BWP indices) may be configured with different bandwidths, and in some cases, different slot formats. The UE may thus switch either: the bandwidth of the flexible BWP to another bandwidth, the slot format of the flexible BWP to another slot format, or both the bandwidth and the slot format of the flexible BWP to another bandwidth or slot format respectively. To allow the UE to determine which parts of a flexible BWP to switch, the base station may indicate the UE in a DCI or an RRC reconfiguration whether to switch the bandwidth and/or slot format.

For example, to indicate a flexible BWP for switching in DCI, the base station may include a bandwidth part indicator field indicating a BWP index for a new active BWP (and thus a new bandwidth) to which the UE will switch in response to the DCI. Alternatively, the bandwidth part indicator field may indicate the same BWP index (and thus the same bandwidth or BWP) which the UE will maintain in response to the DCI. In addition to the bandwidth part indicator field, the DCI may also include a slot format indicator field including one or more bits indicating one of multiple slot formats to which the UE will switch (or indicating whether the UE will maintain the previous slot format) in response to the DCI. For example, if the slot format indicator field of DCI is configured with a first value, the UE may determine to maintain the slot format of the previous active BWP (e.g., the active BWP at the time the DCI was received), if the slot format indicator field is configured with a second value, the UE may determine to switch the slot format to a dedicated slot format of the current active BWP (e.g., indicated in the bandwidth part indicator field), and if the slot format indicator field is configured with a third value, the UE may determine to switch the slot format to another dedicated slot format (if existing) of the current active BWP. Additionally, in some examples, the bandwidth part indicator field may indicate multiple BWP indices from which the UE may determine to activate multiple new active BWPs (e.g., for full duplex communication), or the DCI may include multiple such bandwidth part indicator fields each indicating a BWP index. In such examples, the slot format indicator field may include multiple configured values (one for each active BWP indicating whether to maintain or switch a slot format), or the DCI may include multiple slot format indicator fields each indicating one of such configured values. In response to receiving the DCI, the UE may switch the bandwidth and/or slot format as indicated in the bandwidth part indicator and slot format indicator fields.

Similarly, to indicate a flexible BWP for switching in an RRC configuration, the base station may configure a first active flexible BWP (e.g., an RRC parameter in the configuration) with one of multiple bandwidths and/or slot formats to which the UE will switch following reconfiguration or activation of a cell. The bandwidth for the first active flexible BWP may be indicated, for example, by a configured BWP index, which may be associated with a configured bandwidth in the RRC configuration as previously described. The slot format for the first active flexible BWP may similarly be indicated by the configured BWP index (which may be associated with its own dedicated slot format in the RRC configuration as previously described), or by a separate slot format parameter indicating one of multiple dedicated slot formats for the configured BWP index. In response to receiving the RRC reconfiguration or in response to activating a cell, the UE may switch the bandwidth and/or slot format as indicated by the first active flexible BWP.

Figure 7:
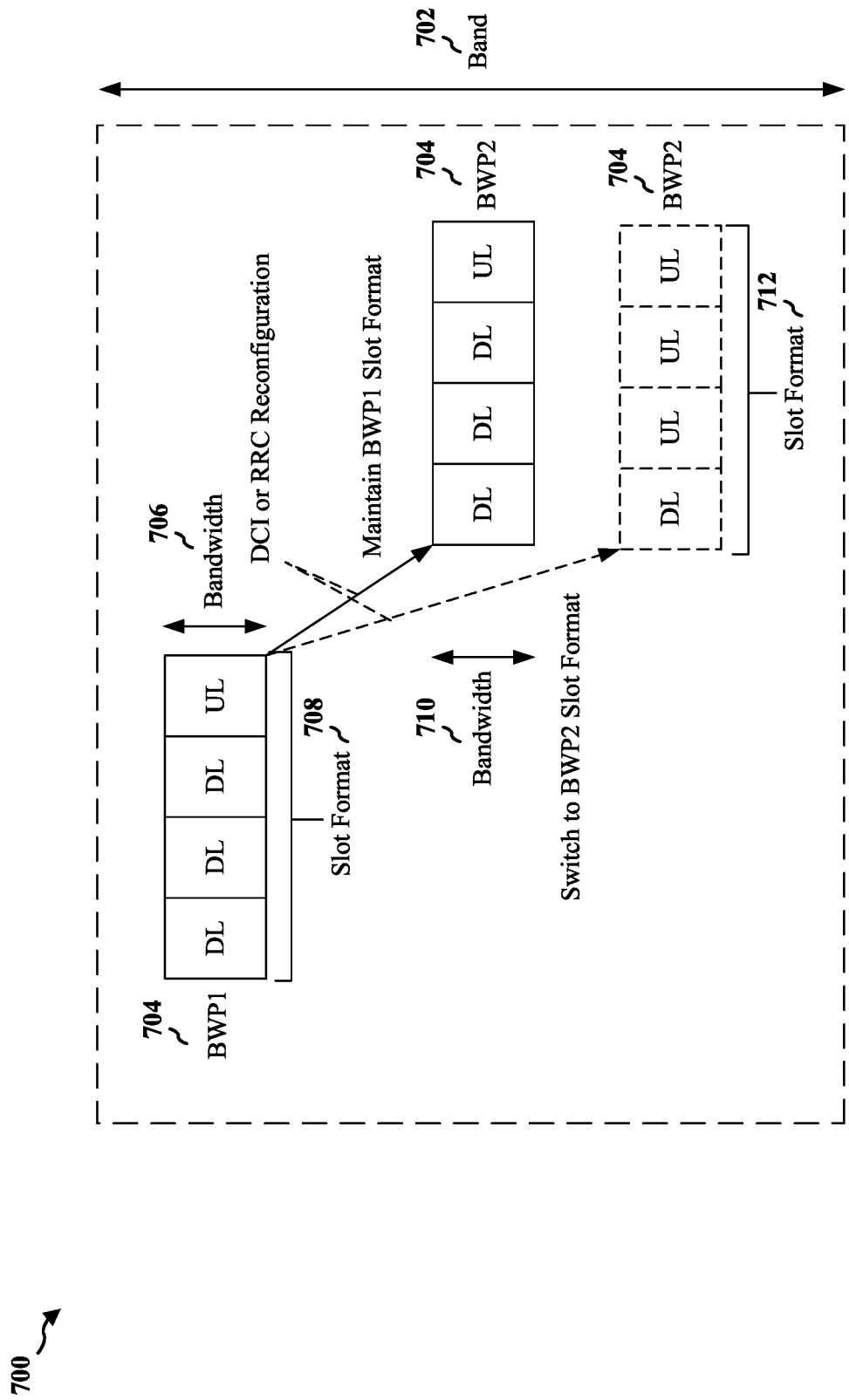
FIG. 7 is a diagram illustrating an example of a band in which a UE may switch between flexible BWPs.

FIG. 7 illustrates an example 700 of a band 702 including flexible BWPs 704 including BWP1 and BWP2, where BWP1 is associated with a bandwidth 706 and slot format 708 (e.g., DL/DU/DL/UL repeating such in BWP1 of FIG. 6), and where BWP2 is associated with a bandwidth 710 and slot format 712 (e.g., DL/UL/UL/UL repeating such as in BWP2 of FIG. 6). The bandwidth 706, 710 and slot format 708, 712 of each BWP may be previously configured in an RRC configuration (e.g., a previous RRC reconfiguration). While BWP1 is active, the base station may provide a DCI or RRC reconfiguration to the UE indicating the UE to switch from the bandwidth of BWP1 to that of BWP2 and/or the slot format of BWP1 to that of BWP2 (or alternatively to maintain the slot format of BWP1). For example, if the base station indicates in DCI or the RRC reconfiguration to maintain slot format 708 of BWP1 for BWP2 (shown by BWP2 in solid lines in the illustrated example), the UE may switch from bandwidth 706 to bandwidth 710 of BWP2, but refrain from switching from slot format 708 to slot format 712 of BWP2 (thus maintaining slot format 708 for BWP2), in response to the DCI or following reconfiguration or activation of a cell. Alternatively, if the base station indicates in the DCI or the RRC reconfiguration to switch to slot format 712 of BWP2 rather than maintain the slot format 708 of BWP1 (shown by BWP2 in dashed lines in the illustrated example), the UE may switch from bandwidth 706 to bandwidth 710 of BWP2, as well as switch from slot format 708 to slot format 712 of BWP2, in response to the DCI or following reconfiguration or activation of a cell.

As described in the above example, a base station may configure each flexible BWP with a dedicated slot format (e.g., in a RRC configuration), and the base station may indicate a UE to either switch from one BWP slot format to another or to maintain the previous BWP slot format (e.g., through an indication in DCI or in a RRC reconfiguration). However, in another example, one or more of these BWPs may not be configured with a dedicated slot format in the RRC configuration (e.g., in a TDD deployment). In such case, if the base station indicates the UE to switch to the slot format of a new active BWP rather than maintain the previous slot format as previously described, the UE may switch the slot format of the new active BWP to that of a band slot format (e.g., the common or dedicated slot format for the cell or UE, rather than a dedicated slot format for a BWP). For instance, in response to receiving a DCI or RRC reconfiguration indicating a new active BWP in a band and indicating to switch the slot format of the current BWP to that of the new active BWP, and in response to determining that the new active BWP is not configured with a dedicated slot format, the UE may switch to the band slot format including the new active BWP. Thus, the band slot format may effectively serve as a default slot format for a flexible BWP which the base station did not configure but still indicates for switching. Alternatively, in another example, the base station may indicate the UE to switch the slot format of a current BWP to the band slot format even if the BWP is configured with a dedicated slot format in the RRC configuration. For example, if the base station provides a DCI including a slot format indicator field configured with a specific value, the UE may determine to switch the slot format of the new active BWP (e.g., indicated in the bandwidth part indicator field) to the band slot format. In either example, the UE may transmit and receive data in the new active BWP according to the current DL/UL symbols in the band slot format. For example, if the band slot format is DL/DL/DL/DL/DL/UL/UL/UL (repeating every eight symbols), and the UE switches to the band slot format at the sixth symbol (UL), the UE may communicate in the new active BWP starting in the UL direction at the sixth symbol and follow the band slot format symbol by symbol accordingly.

Figure 8:
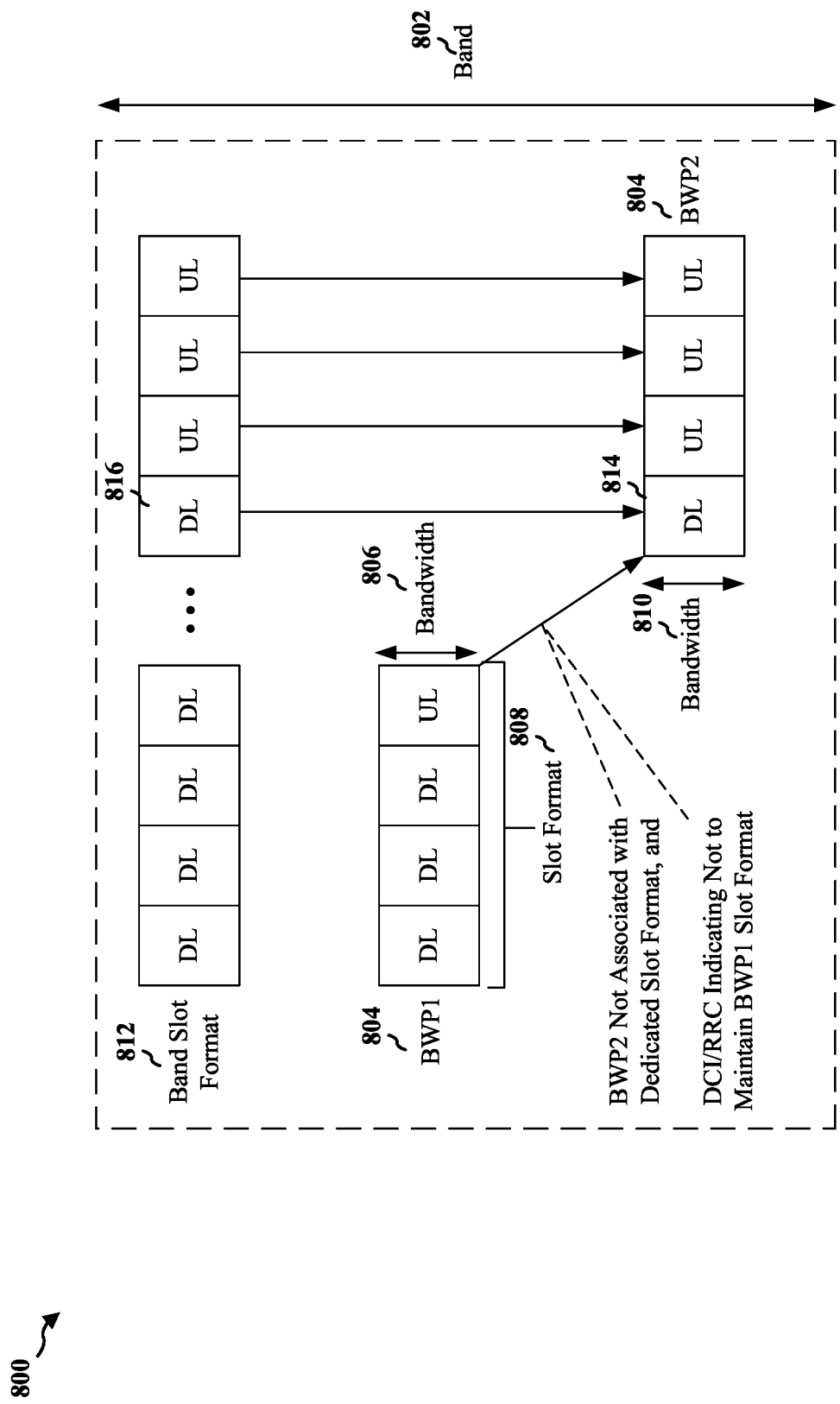
FIG. 8 is a diagram illustrating another example of a band in which a UE may switch between flexible BWPs.

FIG. 8 illustrates an example 800 of a band 802 including flexible BWPs 804 including BWP1 and BWP2, where BWP1 is associated with a bandwidth 806 and slot format 808 (e.g., DL/DL/DL/UL repeating such in BWP1 of FIG. 6), and where BWP2 is associated with a bandwidth 810 but is not associated with its own dedicated slot format. The bandwidth 806, 810 of each of the BWPs may be previously configured in an RRC configuration (e.g., a previous RRC reconfiguration), and only the slot format 808 of BWP1 (and not BWP2) may be previously configured in the RRC configuration. While BWP1 is active, the base station may provide a DCI or RRC reconfiguration to the UE indicating the UE to switch from the bandwidth of BWP1 to that of BWP2 and the slot format of BWP1 to that of a band slot format 812 (e.g., as configured in a common or dedicated TDD slot format configuration). For example, if the base station indicates in DCI or the RRC reconfiguration to switch the slot format 808 of BWP1 rather than maintain the slot format 808, and if BWP2 is not associated with its own dedicated slot format, the UE may switch from slot format 808 to band slot format 812 for BWP2 (as well as from bandwidth 806 to bandwidth 810 of BWP2) in response to the DCI or following reconfiguration or activation of a cell. Alternatively, the base station may indicate in DCI or the RRC reconfiguration to switch the slot format 808 to band slot format 812 for BWP2 even if BWP2 is associated with its own dedicated slot format in the RRC configuration. Once the UE switches to the band slot format 812 for BWP2, the UE may communicate with the base station according to the current DL/UL symbol of the band slot format 812. For example, as illustrated in FIG. 8 the UE may communicate with the base station in BWP2 starting in the DL direction indicated at symbol 814 (aligned with a corresponding symbol 816 of the band slot format 812), and follow the band slot format symbol by symbol in BWP2 accordingly.

As described in the above example, the base station may indicate the UE to switch a bandwidth of a current BWP to that of a new active BWP and to switch the slot format of the current BWP to that of the band slot format. For instance, in response to receiving a DCI indicating a new active BWP in a band and indicating to switch the slot format of a current BWP to that of the new active BWP, and in response to determining that the new active BWP is not configured with a dedicated slot format, the UE may switch to the bandwidth of the new active BWP and follow the band slot format for the new active BWP. In another example, the base station may indicate the UE to maintain the same bandwidth of the current BWP for the active BWP. For instance, the UE may receive a DCI (a downlink grant or uplink grant) which includes a bandwidth part indicator field indicating the same BWP index as that of the current BWP. In such case, if the DCI also includes a slot format indicator field indicating to follow the band slot format for the new active BWP such as previously described, then the UE may maintain the bandwidth of the current BWP for the new active BWP, while changing the slot format of the current BWP to that of the band slot format.

Figure 9:
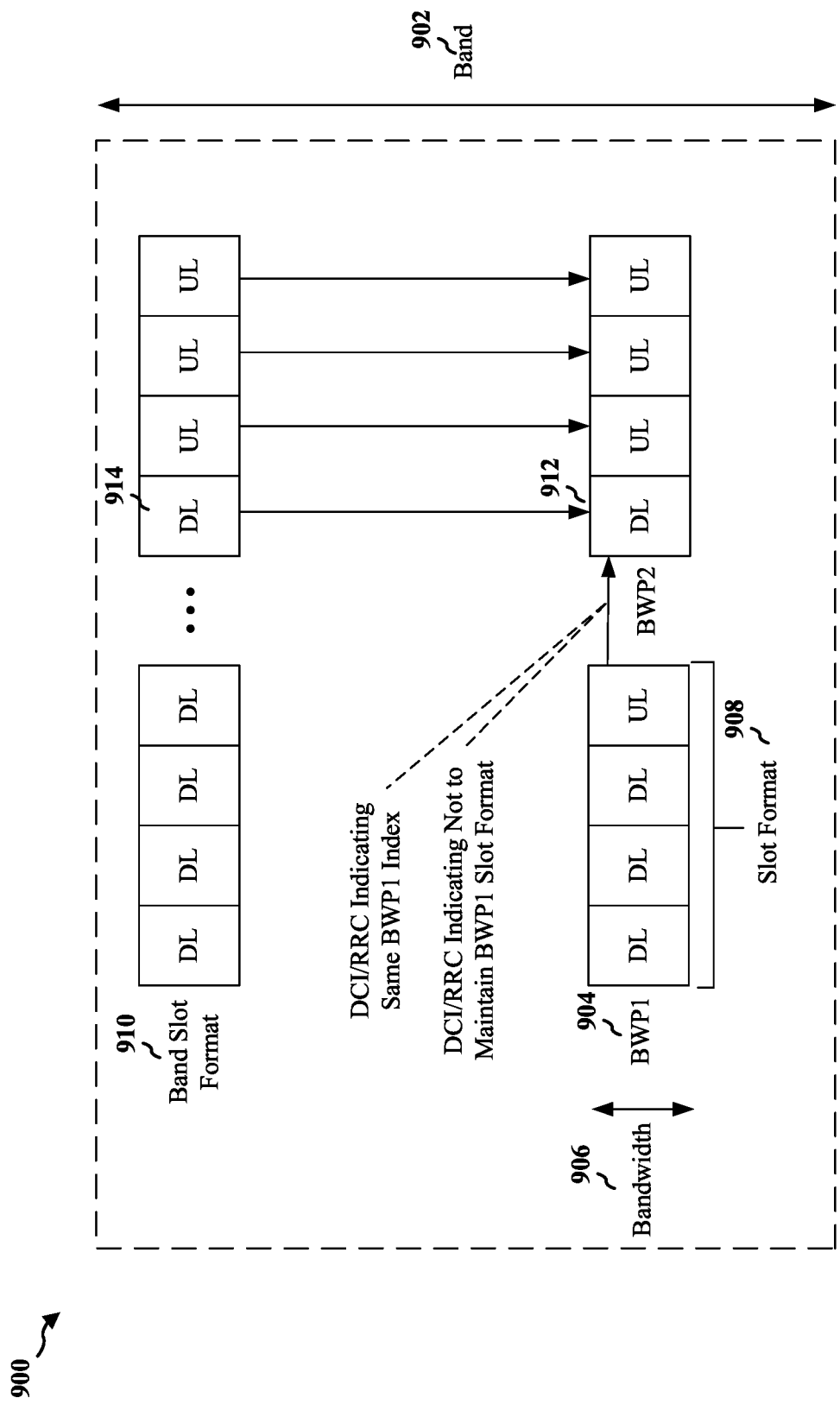
FIG. 9 is a diagram illustrating another example of a band in which a UE may switch between flexible BWPs.

FIG. 9 illustrates an example 900 of a band 902 including flexible BWPs 904 including BWP1 and BWP2, where BWP1 and BWP2 are each associated with a bandwidth 906 and slot format 908 (e.g., DL/DL/DL/UL repeating such in BWP1 of FIG. 6). The bandwidth 906 and slot format 908 of the BWP may be previously configured in an RRC configuration (e.g., a previous RRC reconfiguration). While BWP1 is active, the base station may provide a DCI to the UE indicating the UE to maintain the bandwidth of BWP1 for BWP2, but to switch the slot format of BWP1 to that of a band slot format 910 (e.g., as configured in a common or dedicated TDD slot format configuration). For example, if the base station indicates in DCI the same BWP index for BWP1 and indicates not to maintain the slot format 908 of BWP1, the UE may switch from slot format 908 to band slot format 910 for BWP2 in response to the DCI. Once the UE switches to the band slot format 910 for BWP2, the UE may communicate with the base station according to the current DL/UL symbol of the band slot format 910. For example, as illustrated in FIG. 9, the UE may communicate with the base station in BWP2 starting in the DL direction indicated at symbol 912 (aligned with a corresponding symbol 914 of the band slot format 910), and follow the band slot format symbol by symbol in BWP2 accordingly.

In the aforementioned examples, a base station may indicate a UE in DCI or in an RRC reconfiguration to switch from a bandwidth of one flexible BWP to a bandwidth of another flexible BWP, and/or a slot format of one flexible BWP to a slot format of another flexible BWP (or a band slot format). In another example, the base station may configure the UE to switch the bandwidth and/or slot format of a current BWP to a default, active BWP in response to expiration of a configured BWP inactivity timer (e.g., in a RRC configuration for the BWPs such as previously described). This default, active BWP is separate from the default DL BWP conventionally configured in the RRC configuration as described above. Moreover, the default, active BWP (including default slot format) may be configured in a same or different configuration than the RRC configuration configuring the flexible BWPs and the BWP inactivity timer. For instance, the base station may configure a RRC configuration table which is included within, or alternatively separate from, an RRC reconfiguration assigning the various flexible BWPs, and this RRC configuration table may indicate a new default active BWP and a slot format switching behavior associated with each active BWP which applies in response to expiration of the BWP inactivity timer. The slot format switching behavior may indicate whether the UE is to maintain the slot format of the currently active BWP or whether the UE is to switch the slot format to that of the new active BWP or a band slot format. For example, the RRC configuration table may indicate that if an active BWP currently corresponds to one BWP index, then the UE may switch to one new active BWP according to one slot format switching behavior, and if the active BWP currently corresponds to another BWP index, then the UE may switch to another new active BWP according to another slot format switching behavior. The number of rows/configurations in the table may amount to the number of configured BWPs.

Thus, in the above example, the base station may provide a RRC configuration (e.g., a table) which configures the UE to switch to an indicated, new active BWP according to an indicated, slot format switching behavior upon expiration of the BWP inactivity timer. For instance, if the UE does not receive a DCI scheduling downlink data or uplink data in an active BWP within a number of milliseconds configured for the BWP inactivity timer, the UE may by default switch to a new active BWP according to the slot format switching behavior in the RRC configuration table. However, the RRC configuration table may not be limited in application to BWP inactivity timer expiration. For instance, in another example, the RRC configuration table may be applied to indicate a slot format switching behavior (or a new active BWP) in the event a received DCI does not indicate such information. For instance, while one flexible BWP is active, if the base station provides a DCI to a UE including an empty/blank (or un-decodable) bandwidth part indicator field and/or slot format indicator field, the UE may determine a new active BWP and slot format for switching (effectively filling in the blanks of the DCI) from the RRC configuration table, and the UE may switch to the new flexible BWP accordingly. Alternatively, in another example, the base station may indicate the UE to apply the RRC configuration table more generally when determining new active BWPs and slot format switching behaviors (e.g., in response to an indication DCI or in the RRC configuration causing the UE to refer to the RRC configuration table for flexible BWP switching rather than a bandwidth part indicator or a slot format indicator in DCI or a first active flexible BWP in a RRC configuration such as previously described).

Figure 10:
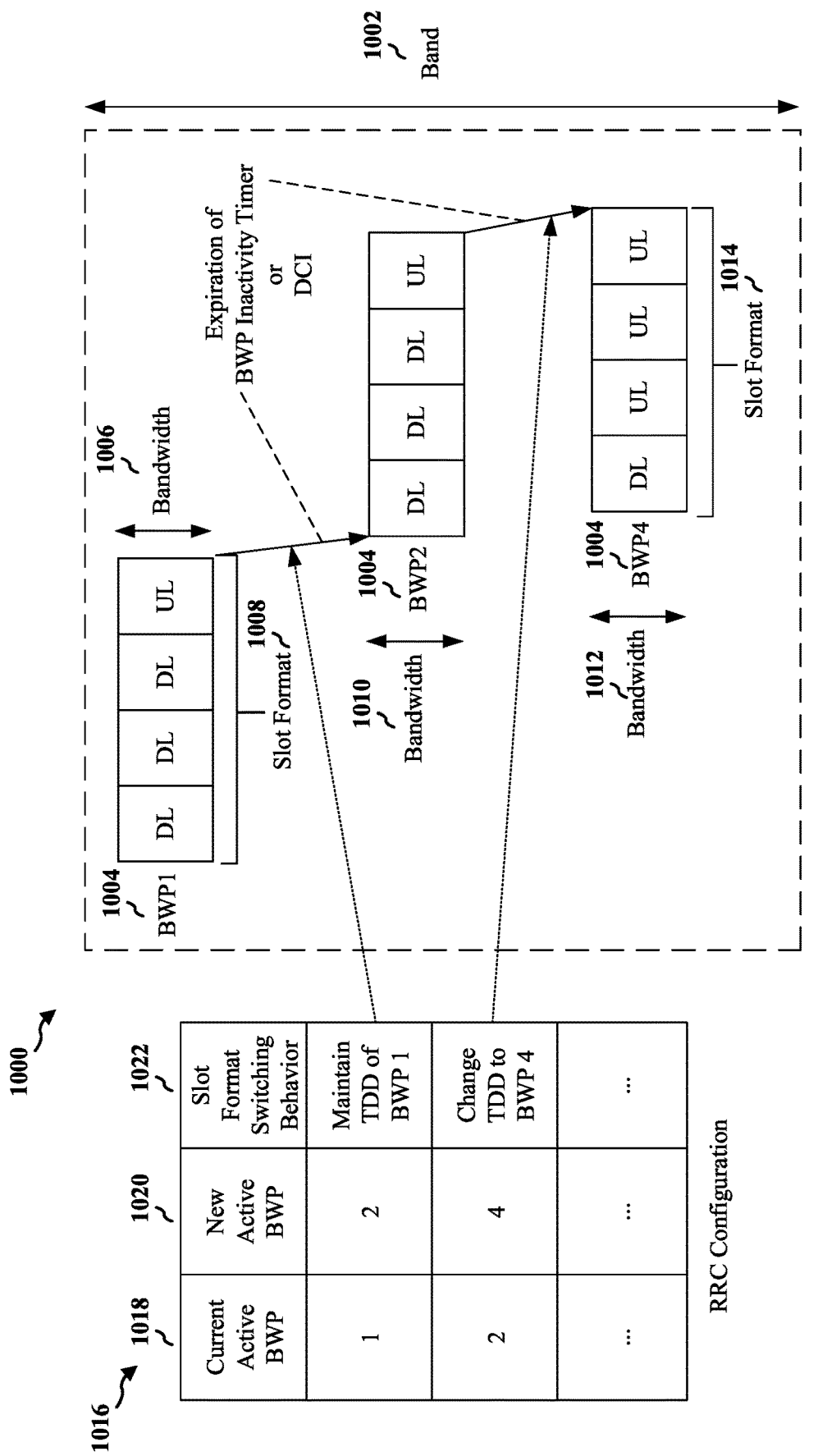
FIG. 10 is a diagram illustrating another example of a band in which a UE may switch between flexible BWPs.

FIG. 10 illustrates an example 1000 of a band 1002 including flexible BWPs 1004 including BWP1, BWP2, BWP3 (not shown), and BWP4 where BWP1 is associated with a bandwidth 1006 and slot format 1008 (e.g., DL/DL/DL/UL repeating such in BWP1 of FIG. 6), where BWP2 is associated with a bandwidth 1010 (but not a slot format), and where BWP4 is associated with a bandwidth 1012 and a slot format 1014 (e.g., DL/UL/UL/UL repeating such as in BWP2 of FIG. 6). The bandwidth 1006, 1010, 1012 and slot format 1008, 1014 of the BWPs may be previously configured in an RRC configuration (e.g., a previous RRC reconfiguration). The base station may configure an RRC configuration 1016 (e.g., a table) indicating associations of active BWPs 1018, next active BWPs 1020, and slot format switching behaviors 1022. The base station and UE may apply the RRC configuration 1016 in response to expiration of a BWP inactivity timer (such as illustrated in the switching from BWP1 to BWP2 in the example of FIG. 10) or in response to missing information in DCI or an indication in DCI (or an RRC reconfiguration) to refer to the RRC configuration 1016 (such as illustrated in the switching from BWP2 to BWP4 in the example of FIG. 10). For instance, if BWP 1 is the current active BWP, then in response to expiration of the BWP inactivity timer (as in the illustrated example), missing information in DCI, or some other indication, the UE may determine from the RRC configuration 1016 to switch the bandwidth 1006 of BWP1 to that of bandwidth 1010 in BWP2, but not to switch the slot format 1008 of BWP1 (and thus to maintain the slot format of BWP1). Thus, in the example of FIG. 10, BWP2 may include the same slot format as BWP1 Similarly, if BWP2 is the current active BWP, then in response to expiration of the BWP inactivity timer, missing information in DCI (as in the illustrated example), or some other indication), the UE may determine from RRC configuration 1016 to switch the bandwidth 1010 of BWP2 to that of bandwidth 1012 of BWP4, and to switch the slot format of BWP2 (e.g., slot format 1008 of BWP1) to the slot format 1014 of BWP4.

Figure 11:
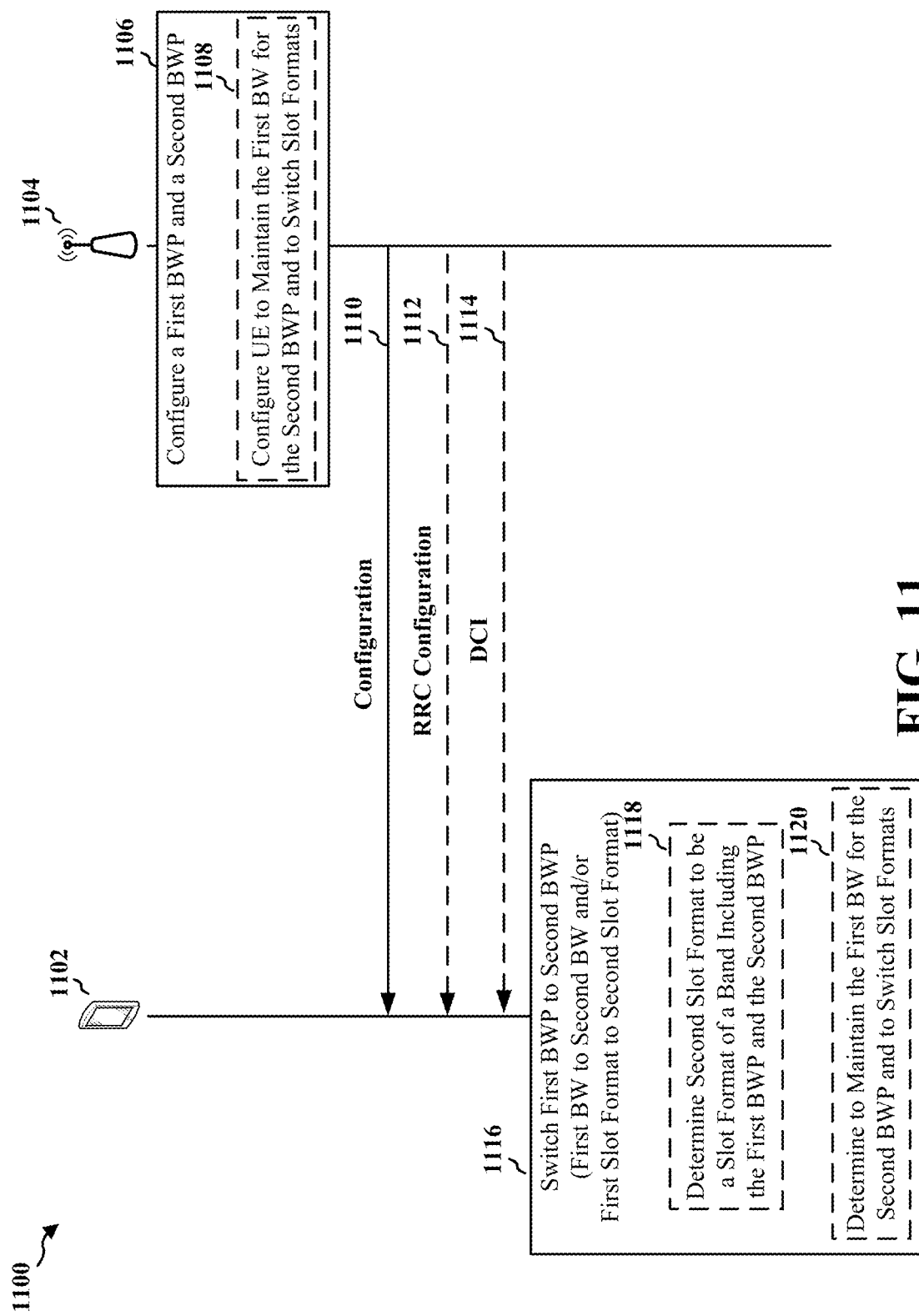
FIG. 11 is a call flow diagram between a UE and a base station.

FIG. 11 is an example 1100 of a call flow between a UE 1102 and a base station 1104. Initially, at 1106, the base station may configure a first BWP and a second BWP. For instance, referring to FIGS. 6-10, the base station may configure flexible BWPs 604, 704, 804, 904, 1004 (e.g., BWP1 and BWP2), where each flexible BWP is associated with bandwidth 606, 706, 710, 806, 810, 906, 1006, 1010, 1012 (e.g., a location and number of contiguous PRBs) and slot format 608, 708, 712, 808, 908, 1008, 1014 (e.g., a pattern of DL, UL, and in some cases flexible symbols).

At 1108, the base station may configure the UE to maintain the first bandwidth (of the first BWP) for the second BWP and to switch the first slot format of the first BWP to a band slot format for the second BWP. For instance, referring to FIG. 9, the base station may configure flexible BWPs 904 including BWP1 and BWP2, where BWP1 and BWP2 are each associated with bandwidth 906 and slot format 908. The bandwidth 906 and slot format 908 of the BWP may be previously configured in an RRC configuration (e.g., a previous RRC reconfiguration). While BWP1 is active, the base station may provide a DCI (or RRC reconfiguration) to the UE indicating the UE to maintain the bandwidth of BWP1 for BWP2, but to switch the slot format of BWP1 to that of a band slot format 910 (e.g., as configured in a common or dedicated TDD slot format configuration). For example, if the base station indicates in DCI (or the RRC reconfiguration) the same BWP index for BWP1 and indicates not to maintain the slot format 908 of BWP1, the UE may switch from slot format 908 to band slot format 910 for BWP2 in response to the DCI.

The base station 1104 may provide a configuration 1110 to the UE 1102. For instance, referring to FIGS. 6-10, the base station may provide a RRC configuration, such as an RRC reconfiguration, to UE which configures flexible BWPs 604, 704, 804, 904, 1004. For example, RRC configuration may include a bit or other indicator associated with a BWP index indicating whether a corresponding BWP is flexible (or conventional), and if the BWP is flexible, the base station may configure a bandwidth for that BWP (e.g., bandwidth 606, 706, 710, 806, 810, 906, 1006, 1010, 1012) and a dedicated slot format (e.g., slot format 608, 708, 712, 808, 908, 1008, 1014) for the BWP in that RRC configuration. In some cases, the base station may not configure a dedicated slot format for a flexible BWP, but rather allow the BWP to follow a band slot format such as described above with respect to FIGS. 8 and 9. Additionally, the configuration 1110 may indicate the UE to switch from the bandwidth of one flexible BWP to that of another flexible BWP (or to maintain the bandwidth between flexible BWPs as described above with respect to FIG. 9), and/or to switch the slot format of one flexible BWP to that of another flexible BWP (e.g., between slot formats 708, 712 as described above with respect to FIG. 7) or the band slot format (e.g., to band slot format 812, 910 as described above with respect to FIGS. 8 and 9). Alternatively, the aforementioned indication(s) may be included in a different configuration than configuration 1110 (e.g., a different RRC reconfiguration).

The base station 1104 may also provide a RRC configuration 1112 to the UE 1102, which table may be included within configuration 1110 or separate from configuration 1110. For instance, referring to FIG. 10, the base station may provide RRC configuration 1016 (e.g., a table) to UE which includes associations of active BWPs 1018, next active BWPs 1020, and slot format switching behaviors 1022, and the base station and UE may apply the RRC configuration in response to expiration of a BWP inactivity timer or in response to missing information in DCI or an indication in DCI (or an RRC reconfiguration) to refer to the RRC configuration 1016. The RRC configuration table may be included within, or alternatively separate from, the RRC reconfiguration assigning the flexible BWPs 604, 704, 804, 904, 1004.

The base station 1104 may further provide a DCI 1114 to the UE 1102. The DCI may indicate flexible BWP switching in addition to downlink or uplink assignments or grants. For instance, in one example referring to FIG. 7, the base station may provide a DCI (including bandwidth part indicator field(s) and slot format indicator field(s)) to the UE indicating the UE to switch from the bandwidth of BWP1 to that of BWP2 and/or the slot format of BWP1 to that of BWP2 (or alternatively to maintain the slot format of BWP1). In another example referring to FIG. 8, the base station may provide a DCI to the UE indicating the UE to switch from the bandwidth of BWP1 to that of BWP2 and the slot format of BWP1 to that of band slot format 812. In a further example referring to FIG. 9, the base station may provide a DC to the UE indicating the UE to maintain the bandwidth of BWP1 for BWP2, but to switch the slot format of BWP1 to that of band slot format 910. In an additional example referring to FIG. 10, if BWP2 is the current active BWP, then in response to expiration of the BWP inactivity timer, missing information in DCI (as in the illustrated example), or some other indication (e.g., in the DCI), the UE may determine from RRC configuration 1016 to switch the bandwidth 1010 of BWP2 to that of bandwidth 1012 of BWP4, and to switch the slot format of BWP2 (e.g., slot format 1008 of BWP1) to the slot format 1014 of BWP4.

At 1116, the UE 1102 may switch a first BWP to a second BWP, during which the bandwidth of the first BWP is switched to the bandwidth of the second BWP and/or the slot format of the first BWP is switched to the slot format of the second BWP. For instance, referring to FIGS. 7-10, the UE may switch between flexible BWPs 604, 704, 804, 904, 1004 (e.g., between BWP1 and BWP2) in bandwidth (e.g., bandwidth 606, 706, 710, 806, 810, 906, 1006, 1010, 1012) and/or slot format (e.g., slot format 608, 708, 712, 808, 908, 1008, 1014). As an example, referring to FIG. 7, while BWP1 is active, the base station may provide DCI 1114 or an RRC reconfiguration (e.g., configuration 1110 or a different configuration) to the UE indicating the UE to switch from the bandwidth of BWP1 to that of BWP2 and/or the slot format of BWP1 to that of BWP2 (or alternatively to maintain the slot format of BWP1). For example, if the base station indicates in DCI or the RRC reconfiguration to maintain slot format 708 of BWP1 for BWP2 (shown by BWP2 in solid lines in the illustrated example), the UE may switch from bandwidth 706 to bandwidth 710 of BWP2, but refrain from switching from slot format 708 to slot format 712 of BWP2 (thus maintaining slot format 708 for BWP2), in response to the DCI or following reconfiguration or activation of a cell. Alternatively, if the base station indicates in the DCI or the RRC reconfiguration to switch to slot format 712 of BWP2 rather than maintain the slot format 708 of BWP1 (shown by BWP2 in dashed lines in the illustrated example), the UE may switch from bandwidth 706 to bandwidth 710 of BWP2, as well as switch from slot format 708 to slot format 712 of BWP2, in response to the DCI or following reconfiguration or activation of a cell.

At 1118, the UE 1102 may determine the slot format for the second BWP to be a slot format of a band including the first BWP and the second BWP. For instance, referring to FIG. 8, while BWP1 is active, the base station may provide DCI 1114 or an RRC reconfiguration (e.g., configuration 1110 or a different configuration) to the UE indicating the UE to switch from the bandwidth of BWP1 to that of BWP2 and the slot format of BWP1 to that of a band slot format 812 (e.g., as configured in a common or dedicated TDD slot format configuration). For example, if the UE determines that the DCI or the RRC reconfiguration indicates the UE to switch the slot format 808 of BWP1 rather than maintain the slot format 808, and if the UE determines from the RRC reconfiguration that BWP2 is not associated with its own dedicated slot format, the UE may switch from slot format 808 to band slot format 812 for BWP2 (as well as from bandwidth 806 to bandwidth 810 of BWP2) in response to the DCI or following reconfiguration or activation of a cell.

At 1120, the UE 1102 may determine to maintain the bandwidth of the first BWP for the second BWP and to switch the slot format of the first BWP to the slot format of a band including the first BWP and the second BWP. For instance, referring to FIG. 9, while BWP1 is active, the base station may provide DCI 1114 or an RRC reconfiguration (e.g., configuration 1110 or a different configuration) to the UE indicating the UE to maintain the bandwidth of BWP1 for BWP2, but to switch the slot format of BWP1 to that of a band slot format 910 (e.g., as configured in a common or dedicated TDD slot format configuration). For example, if UE determines that the DCI indicates the same BWP index for BWP1 and indicates not to maintain the slot format 908 of BWP1, the UE may switch from slot format 908 to band slot format 910 for BWP2 in response to the DCI.

Figure 12:
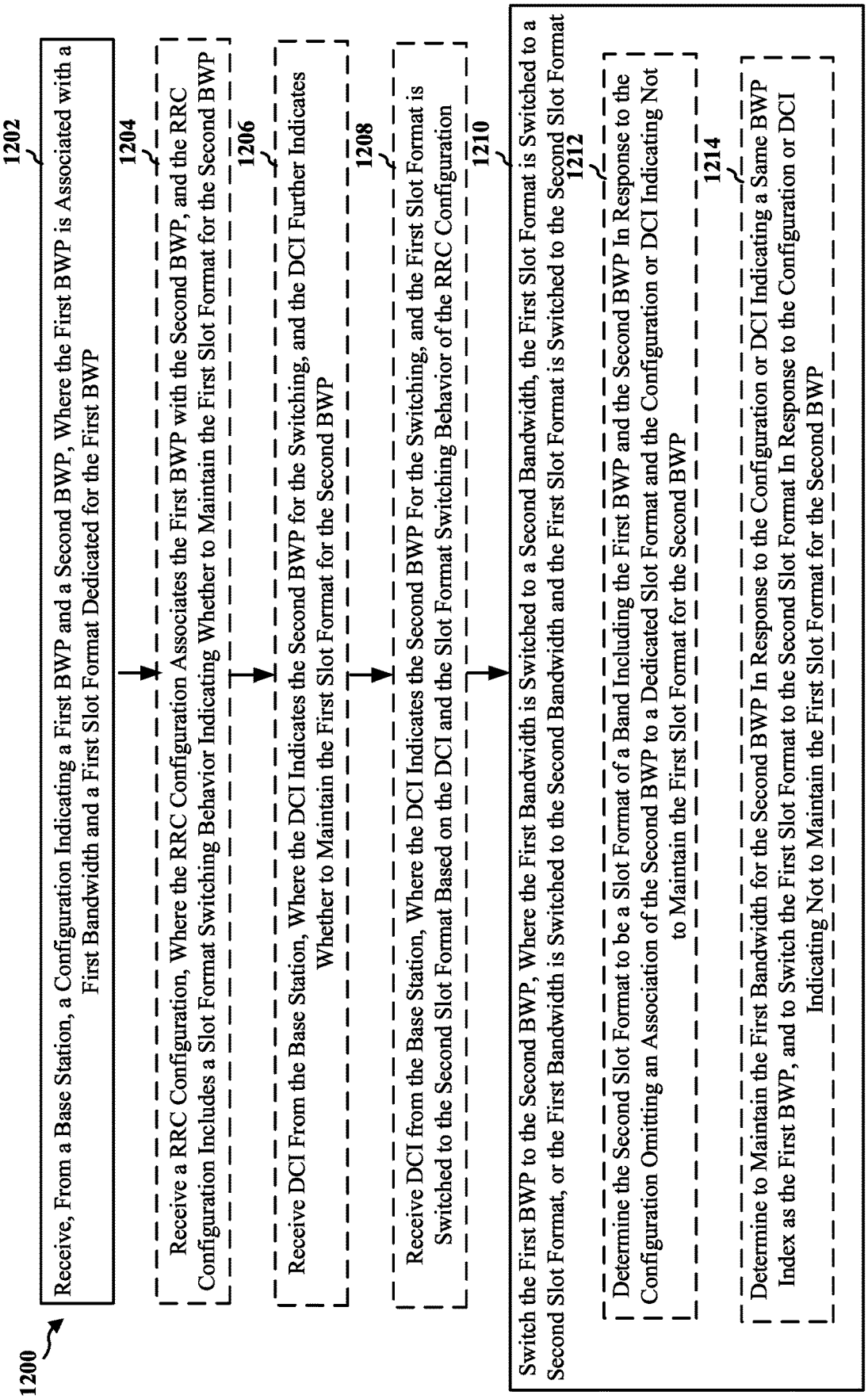
FIG. 12 is a flowchart of a method of wireless communication at a UE.

FIG. 12 is a flowchart 1200 of a method of wireless communication. The method may be performed by a UE (e.g., the UE 104, 1102: the apparatus 1402). Optional aspects are illustrated in dashed lines. The method allows a UE to switch between flexible BWPs.

At 1202, the UE receives, from a base station, a configuration of a first BWP and a second BWP, where the first BWP is associated with a first bandwidth and a first slot format dedicated for the first BWP. For example, 1202 may be performed by configuration reception component 1440. For instance, referring to FIGS. 6-11, the UE 1102 may receive, from base station 1104, configuration 1110 of flexible BWPs 604, 704, 804, 904, 1004 including BWP1 (the first BWP) and BWP2 (the second BWP), where BWP1 is associated with bandwidth 606, 706, 806, 906, 1006 (the first bandwidth) and slot format 608, 708, 808, 908, 1008 (the first slot format) dedicated for BWP1.

At 1204, the UE may receive a RRC configuration, where the RRC configuration associates the first BWP with the second BWP, the RRC configuration includes a slot format switching behavior indicating whether to maintain the first slot format for the second BWP, and the first slot format is switched (at 1210) to a second slot format based on the RRC configuration. For example, 1204 may be performed by RRC configuration component 1448. For instance, referring to FIGS. 6-11, the UE 1102 may receive RRC configuration 1016, 1112 associating active BWPs 1018 (including BWP1) with next active BWPs 1020 (including BWP2). The RRC configuration 1016, 1112 includes slot format switching behaviors 1022 indicating whether the base station and UE are to maintain slot format 608, 708, 808, 908, 1008 (the first slot format) for BWP2 or switch to a second slot format (e.g., slot format 712, 1014), and the UE may switch (at 1116) to the second slot format based on RRC configuration 1016, 1112. For instance, the first illustrated row of RRC configuration 1016 in the example of FIG. 10 may indicate the UE to maintain the slot format of the current active BWP for the next active BWP, while the second illustrated row of RRC configuration 1016 in the example of FIG. 10 may indicate the UE to switch the slot format of the current active BWP to the dedicated slot format of the new active BWP. In one example, the first slot format may be switched (at 1210) to the second slot format further in response to an expiration of a BWP inactivity timer. For instance, referring to FIGS. 10 and 11, the UE may switch (at 1116) to slot format 1014 in response to expiration of a BWP inactivity timer configured in configuration 1110 (or RRC configuration 1016, 1112).

At 1206, the UE may receive DCI from the base station, where the DCI indicates the second BWP for the switching (at 1210), and the DCI further indicates whether to maintain the first slot format for the second BWP. For example, 1206 may be performed by DCI component 1444. In one example, the first slot format may be switched to the second slot format in response to the DCI. For instance, referring to FIGS. 7 and 11, the UE 1102 may receive DCI 1114 from base station 1104 indicating (e.g., in a bandwidth part indicator field) the UE to switch at 1116 to the flexible BWP 704 identified as BWP2 in FIG. 7. The DCI 1114 may further indicate in a slot format indicator field whether the UE is to maintain slot format 708 of BWP1 for BWP2 after the switching or whether the UE is to apply slot format 712 (e.g., the dashed lined slot format of BWP2 in FIG. 7). For example, the UE may switch at 1116 from slot format 708 to slot format 712 in response to the DCI 1114.

In one example, the configuration (received at 1202) may be a RRC reconfiguration, the RRC reconfiguration indicates the second BWP for the switching (at 1210), and the RRC reconfiguration further indicates whether to maintain the first slot format for the second BWP. In one example, the first slot format may be switched to the second slot format in response to the RRC reconfiguration. For instance, referring to FIGS. 7 and 11, the configuration 1110 from base station 1104 may also indicate (e.g., in a first active flexible BWP parameter) the UE to switch at 1116 to the flexible BWP 704 identified as BWP2 in FIG. 7 following reconfiguration or activation of a cell. The configuration 1110 may further indicate (e.g., in the first active flexible BWP parameter) whether the UE is to maintain slot format 708 of BWP1 for BWP2 after the switching or whether the UE is to apply slot format 712 (e.g., the dashed lined slot format of BWP2 in FIG. 7). For example, the UE may switch at 1116 from slot format 708 to slot format 712 in response to the configuration 1110.

At 1208, the UE may receive DCI from the base station, where the DCI indicates the second BWP for the switching, and the first slot format is switched to the second slot format based on the DCI and the slot format switching behavior of the RRC configuration (received at 1204). For example, 1208 may be performed by DCI component 1444. For instance, referring to FIGS. 10 and 11, the UE 1102 may receive DCI 1114 from base station 1104 indicating (e.g., in a bandwidth part indicator field) the UE to switch at 1116 to the flexible BWP 1004 identified as BWP4 (here the second BWP) in FIG. 10. Moreover, the UE may receive RRC configuration 1016, 1112 including slot format switching behaviors 1022 indicating the UE to switch from a first slot format (e.g., slot format 1008) to a second slot format (e.g., slot format 1014) for BWP4, as illustrated for example by the second row of RRC configuration 1016 in FIG. 10. In response to the DCI 1114 and RRC configuration 1016, 1112, the UE may switch (at 1116) from slot format 1008 to slot format 1014.

At 1210, the UE switches the first BWP to the second BWP, where the first bandwidth is switched to a second bandwidth, the first slot format is switched to a second slot format, or the first bandwidth is switched to the second bandwidth and the first slot format is switched to the second slot format. For example, 1210 may be performed by switch component 1442. For instance, referring to FIGS. 6-11, at 1116, the UE may switch from one of the flexible BWPs 604, 704, 804, 904, 1004 (the first BWP, for example, BWP1) to another one of the flexible BWPs 604, 704, 804, 904, 1004 (the second BWP, for example, BWP2). In one example, referring to FIGS. 7 and 10, the UE may switch from the first BWP including bandwidth 706, 1006 to a second BWP including bandwidth 710, 1010, but the UE may maintain the slot format 708, 1008 of the first BWP for the second BWP. Thus, in this example, only the bandwidth of the first BWP (and not the slot format) may be switched to another bandwidth (e.g., of the second BWP). In another example, referring to FIG. 9, the UE may switch from the first BWP including bandwidth 906 to a second BWP including the same bandwidth (e.g., the same location and contiguous number of PRBs, or the same BWP index), but the UE may switch from the slot format 908 of the first BWP to another slot format (e.g., band slot format 910). Thus, in this example, only the slot format of the first BWP (and not the bandwidth) may be switched to another slot format (e.g., of a band, or in other examples, of the second BWP). In a further example, referring to FIGS. 7, 8, and 10, the UE may switch from the first BWP including bandwidth 706, 806, 1006 to a second BWP including bandwidth 710, 810, 1012, and the UE may also switch from the slot format 708, 808, 1008 of the first BWP to another slot format (e.g., slot format 712, 1014 or band slot format 812). Thus, in this example, both the bandwidth and the slot format of the first BWP may be switched to another bandwidth (e.g., of the second BWP) and another slot format (e.g., of the second BWP or a band), respectively.

At 1212, the UE may determine the second slot format (switched to at 1210) to be a slot format of a band including the first BWP and the second BWP in response to: the configuration (received at 1202) omitting an association of the second BWP to a dedicated slot format, and the configuration (received at 1202) or DCI (received at 1206 or 1208) indicating not to maintain the first slot format for the second BWP. For example, 1212 may be performed by determination component 1446. For instance, referring to FIGS. 8 and 11, at 1118, the UE 1102 may determine to switch at 1116 from slot format 808 to band slot format 812 (e.g., the slot format of band 802 which includes the flexible BWPs 804, BWP1 and BWP2). The UE may make this determination (and thus apply the band slot format 812) in response to identifying that configuration 1110 does not associate BWP2 to a dedicated slot format, and further in response to identifying that configuration 1110 or DCI 1114 (if received) indicates to switch to another slot format than slot format 808. For example, if the UE identifies that a slot format parameter associated with the corresponding BWP index for BWP2 in an RRC reconfiguration is empty/blank/unused, and that a slot format parameter associated with the corresponding BWP index for the first active flexible BWP in the RRC reconfiguration, or a slot format indicator field in DCI, includes a value which indicates the UE not to maintain slot format 808 for the second BWP, the UE may determine to switch to band slot format 812.

At 1214, the UE may determine to maintain the first bandwidth for the second BWP in response to the configuration (received at 1202) or DCI (received at 1206 or 1208) indicating a same BWP index as the first BWP, and to switch the first slot format to the second slot format (at 1210) in response to the configuration or DCI indicating not to maintain the first slot format for the second BWP, where the second slot format is a slot format of a band including the first BWP and the second BWP in response to the determination (at 1214). For example, 1214 may be performed by determination component 1446. For instance, referring to FIGS. 9 and 11, at 1120, the UE 1102 may determine to maintain bandwidth 906 of BWP1 for BWP2 in response to identifying that the configuration 1110 or DCI 1114 (if received) indicates a same BWP index as BWP1 (in other words, that BWP2 is BWP1 in terms of bandwidth [but not necessarily slot format]). For example, if the UE identifies that first active flexible BWP in an RRC reconfiguration, or a bandwidth part indicator field in DCI, includes the same BWP index as the currently active BWP, the UE may determine not to change to a different location and number of contiguous PRBs. Moreover, in response to this determination, the UE 1102 may switch at 1116 the slot format 908 of BWP1 to the band slot format 910 if the configuration 1110 or DCI 1114 indicates not to maintain slot format 908 (the slot format of band 902 including the flexible BWP 904) for BWP2. For example, the UE may determine to switch to band slot format 910 if a slot format parameter associated with the first active flexible BWP in an RRC reconfiguration, or a slot format indicator field in DCI, includes a value which indicates the UE not to maintain slot format 908 for the second BWP.

Figure 13:
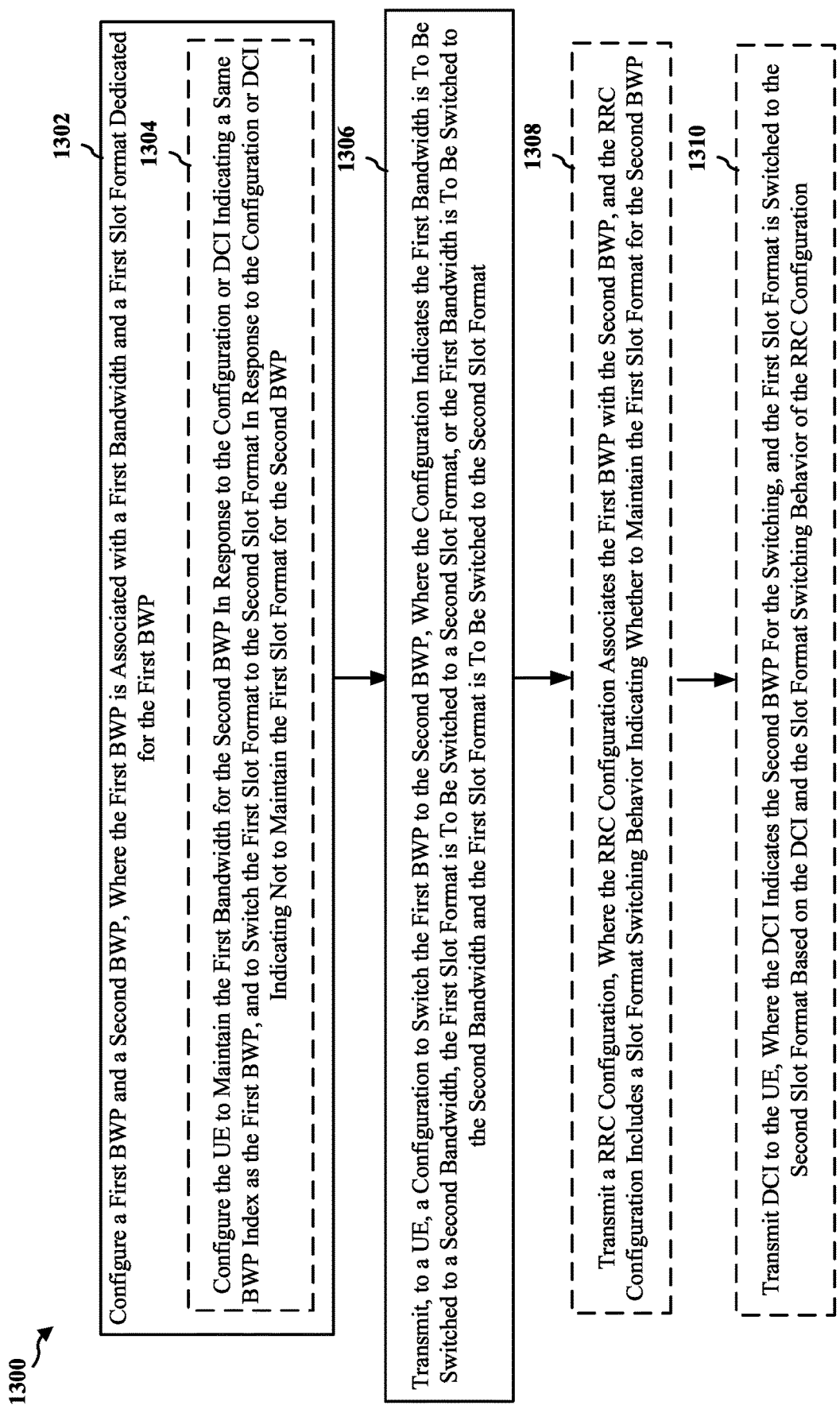
FIG. 13 is a flowchart of a method of wireless communication at a base station.

FIG. 13 is a flowchart 1300 of a method of wireless communication. The method may be performed by a base station (e.g., the base station 102/180, 1104; the apparatus 1502. Optional aspects are illustrated in dashed lines. The method allows a base station to configure flexible BWPs and to configure a UE to switch flexible BWPs.

At 1302, the base station configures a first BWP and a second BWP, where the first BWP is associated with a first bandwidth and a first slot format dedicated for the first BWP. For example, 1302 may be performed by configuration component 1540. For instance, referring to FIGS. 6-11, at 1106, the base station 1104 may configure flexible BWPs 604, 704, 804, 904, 1004 including BWP1 (the first BWP) and BWP2 (the second BWP) in configuration 1110, where BWP1 is associated with bandwidth 606, 706, 806, 906, 1006 (the first bandwidth) and slot format 608, 708, 808, 908, 1008 (the first slot format) dedicated for BWP1.

At 1304, the base station may configure the UE to maintain the first bandwidth for the second BWP in response to a configuration (transmitted at 1306) or DCI (transmitted at 1310 for example) indicating a same BWP index as the first BWP, and the base station may configure the UE to switch the first slot format to a second slot format in response to the configuration or DCI indicating not to maintain the first slot format for the second BWP, where the second slot format is a slot format of a band including the first BWP and the second BWP. For example, 1304 may be performed by configuration component 1540. For instance, referring to FIGS. 9 and 11, at 1108, the base station 1104 may configure the UE to maintain bandwidth 906 of BWP1 for BWP2 (e.g., by providing configuration 1110 or DCI 1114 (if transmitted) indicating a same BWP index as BWP1 (in other words, that BWP2 is BWP1 in terms of bandwidth [but not necessarily slot format])). For example, if the base station configures a first active flexible BWP in an RRC reconfiguration, or a bandwidth part indicator field in DCI, to include the same BWP index as the currently active BWP, the base station may configure the UE not to change to a different location and number of contiguous PRBs. Moreover, the base station 1104 may configure the UE 1102 to switch at 1116 the slot format 908 of BWP1 to the band slot format 910 (e.g., by providing the configuration 1110 or DCI 1114 indicating not to maintain slot format 908 (the slot format of band 902 including the flexible BWP 904) for BWP2). For example, the base station may configure the UE to switch to band slot format 910 if a slot format parameter associated with the first active flexible BWP in an RRC reconfiguration, or a slot format indicator field in DCI, includes a value which indicates the UE not to maintain slot format 908 for the second BWP.

At 1306, the base station transmits, to a UE, a configuration to switch the first BWP to the second BWP, where the configuration indicates: the first bandwidth is to be switched to a second bandwidth, the first slot format is to be switched to a second slot format, or the first bandwidth is to be switched to the second bandwidth and the first slot format is to be switched to the second slot format. For example, 1306 may be performed by configuration transmission component 1542. For instance, referring to FIGS. 6-11, the base station 1104 may transmit DCI 1114 (one example of the configuration) or an RRC reconfiguration (e.g., configuration 1110) which configures the UE 1102 to switch (at 1116) from one of the flexible BWPs 604, 704, 804, 904, 1004 (the first BWP, for example, BWP1) to another one of the flexible BWPs 604, 704, 804, 904, 1004 (the second BWP, for example, BWP2). In one example, referring to FIGS. 7 and 10, the DCI or RRC reconfiguration may indicate the UE to switch from the first BWP including bandwidth 706, 1006 to a second BWP including bandwidth 710, 1010, but to maintain the slot format 708, 1008 of the first BWP for the second BWP. Thus, in this example, only the bandwidth of the first BWP (and not the slot format) may be switched to another bandwidth (e.g., of the second BWP). In another example, referring to FIG. 9, the DCI or RRC reconfiguration may indicate the UE to switch from the first BWP including bandwidth 906 to a second BWP including the same bandwidth (e.g., the same location and contiguous number of PRBs, or the same BWP index), but to switch from the slot format 908 of the first BWP to another slot format (e.g., band slot format 910). Thus, in this example, only the slot format of the first BWP (and not the bandwidth) may be switched to another slot format (e.g., of a band, or in other examples, of the second BWP). In a further example, referring to FIGS. 7, 8, and 10, the DCI or RRC reconfiguration may indicate the UE to switch from the first BWP including bandwidth 706, 806, 1006 to a second BWP including bandwidth 710, 810, 1012, and the DCI or RRC reconfiguration may indicate the UE to switch from the slot format 708, 808, 1008 of the first BWP to another slot format (e.g., slot format 712, 1014 or band slot format 812). Thus, in this example, both the bandwidth and the slot format of the first BWP may be switched to another bandwidth (e.g., of the second BWP) and another slot format (e.g., of the second BWP or a band), respectively.

In one example, the configuration may be DCI, the DCI indicates the second BWP for the switching, and the DCI further indicates whether to maintain the first slot format for the second BWP. In one example, the first slot format may be switched to the second slot format in response to the DCI. For instance, referring to FIGS. 7 and 11, the base station 1104 may configure DCI 1114 to indicate (e.g., in a bandwidth part indicator field) the UE to switch at 1116 to the flexible BWP 704 identified as BWP2 in FIG. 7. The base station may further configure DCI 1114 to indicate in a slot format indicator field whether the UE is to maintain slot format 708 of BWP1 for BWP2 after the switching or whether the UE is to apply slot format 712 (e.g., the dashed lined slot format of BWP2 in FIG. 7). For example, the DCI 1114 may indicate the UE to switch at 1116 from slot format 708 to slot format 712.

In one example, the configuration may be a RRC reconfiguration, the RRC reconfiguration indicates the second BWP for the switching, and the RRC reconfiguration further indicates whether to maintain the first slot format for the second BWP. In one example, the first slot format may be switched to the second slot format in response to the RRC reconfiguration. For instance, referring to FIGS. 7 and 11, the configuration 1110 from base station 1104 may also indicate (e.g., in a first active flexible BWP parameter) the UE to switch at 1116 to the flexible BWP 704 identified as BWP2 in FIG. 7 following reconfiguration or activation of a cell. The configuration 1110 may further indicate (e.g., in the first active flexible BWP parameter) whether the UE is to maintain slot format 708 of BWP1 for BWP2 after the switching or whether the UE is to apply slot format 712 (e.g., the dashed lined slot format of BWP2 in FIG. 7). For example, the configuration 1110 may indicate the UE to switch at 1116 from slot format 708 to slot format 712.

In one example, the second slot format may be a slot format of a band including the first BWP and the second BWP in response to: the configuration omitting an association of the second BWP to a dedicated slot format, and the configuration or DCI indicating not to maintain the first slot format for the second BWP. For instance, referring to FIGS. 8 and 11, at 1118, the base station 1104 may configure the UE 1102 to switch at 1116 from slot format 808 to band slot format 812 (e.g., the slot format of band 802 which includes the flexible BWPs 804, BWP1 and BWP2). The base station may configure the UE to make this switch (and thus apply the band slot format 812) by refraining from including in configuration 1110 an association of BWP2 to a dedicated slot format, and further by indicating in configuration 1110 or DCI 1114 the UE to switch to another slot format than slot format 808. For example, if the base station refrains from setting a slot format parameter associated with the corresponding BWP index for BWP2 in an RRC reconfiguration (e.g., the base station leaves the parameter empty/blank/unused), and if the base station configures a slot format parameter associated with the corresponding BWP index for the first active flexible BWP in the RRC reconfiguration, or a slot format indicator field in DCI, to include a value which indicates the UE not to maintain slot format 808 for the second BWP, the base station may configure the UE to switch to band slot format 812.

At 1308, the base station may transmit a RRC configuration, where the RRC configuration associates the first BWP with the second BWP, the RRC configuration includes a slot format switching behavior indicating whether to maintain the first slot format for the second BWP, and the first slot format is switched to the second slot format based on the RRC configuration. For example, 1308 may be performed by RRC configuration component 1544. For instance, referring to FIGS. 6-11, the base station 1104 may transmit RRC configuration 1016, 1112 to UE 1102 which associates active BWPs 1018 (including BWP1) with next active BWPs 1020 (including BWP2). The RRC configuration 1016, 1112 includes slot format switching behaviors 1022 indicating whether the base station and UE are to maintain slot format 608, 708, 808, 908, 1008 (the first slot format) for BWP2 or switch to a second slot format (e.g., slot format 712, 1014), and the base station may thus configure the UE to switch (at 1116) to the second slot format based on RRC configuration 1016, 1112. For instance, the first illustrated row of RRC configuration 1016 in the example of FIG. 10 may indicate the UE to maintain the slot format of the current active BWP for the next active BWP, while the second illustrated row of RRC configuration 1016 in the example of FIG. 10 may indicate the UE to switch the slot format of the current active BWP to the dedicated slot format of the new active BWP. In one example, the first slot format is switched to the second slot format further in response to an expiration of a BWP inactivity timer. For instance, referring to FIGS. 10 and 11, the base station may configure the UE switch (at 1116) to slot format 1014 in response to expiration of a BWP inactivity timer configured in configuration 1110 (or RRC configuration 1016, 1112).

At 1310, the base station transmits DCI to the UE, where the DCI indicates the second BWP for the switching, and the first slot format is switched to the second slot format based on the DCI and the slot format switching behavior of the RRC configuration. For example, 1310 may be performed by DCI component 1546. For instance, referring to FIGS. 10 and 11, the base station 1104 may transmit DCI 1114 to UE 1102 indicating (e.g., in a bandwidth part indicator field) the UE to switch at 1116 to the flexible BWP 1004 identified as BWP4 (here the second BWP) in FIG. 10. Moreover, the base station may transmit RRC configuration 1016, 1112 including slot format switching behaviors 1022 indicating the UE to switch from a first slot format (e.g., slot format 1008) to a second slot format (e.g., slot format 1014) for BWP4, as illustrated for example by the second row of RRC configuration 1016 in FIG. 10. Based on the DCI 1114 and RRC configuration 1016, 1112, the base station may configure the UE to switch (at 1116) from slot format 1008 to slot format 1014.

Figure 14:
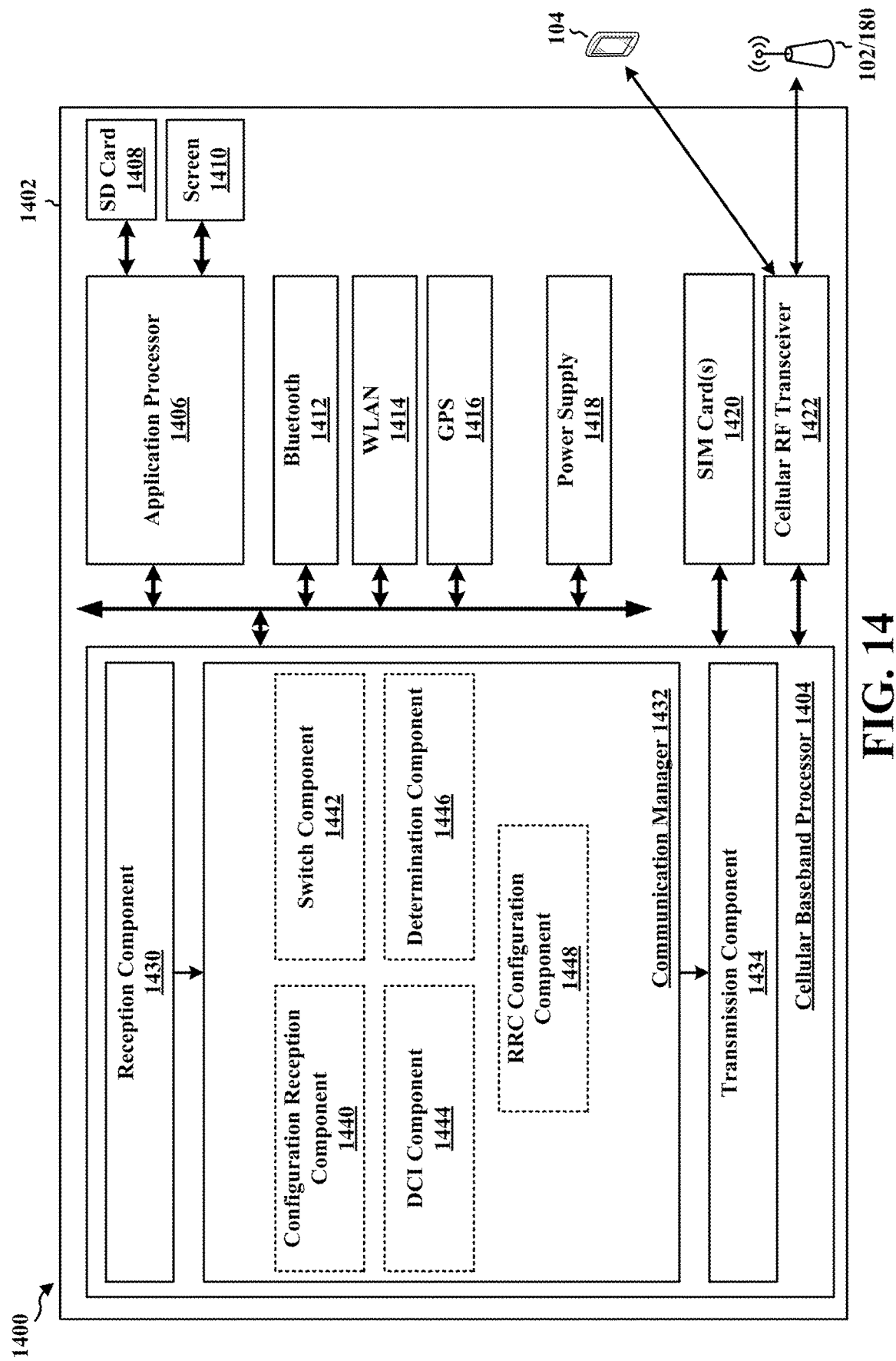
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes a configuration reception component 1440 that is configured to receive, from a base station, a configuration of a first BWP and a second BWP, where the first BWP is associated with a first bandwidth and a first slot format dedicated for the first BWP, e.g., as described in connection with 1202. The communication manager 1432 further includes a RRC configuration component 1448 that is configured to receive a RRC configuration, where the RRC configuration associates the first BWP with the second BWP, and the RRC configuration includes a slot format switching behavior indicating whether to maintain the first slot format for the second BWP, e.g., as described in connection with 1204. The first slot format is switched (by switch component 1442) to the second slot format based on the RRC configuration. The communication manager 1432 further includes a DCI component 1444 that is configured to receive DCI from the base station, where the DCI indicates the second BWP for the switching, and the DCI further indicates whether to maintain the first slot format for the second BWP, e.g., as described in connection with 1206. The DCI component 1444 further receives input in the form of the RRC configuration from the RRC configuration component 1448 and is further configured to receive DCI from the base station, where the DCI indicates the second BWP for the switching, and the first slot format is switched to the second slot format based on the DCI and the slot format switching behavior of the RRC configuration, e.g., as described in connection with 1208. The communication manager 1432 further includes a switch component 1442 that receives input in the form of the first BWP and the second BWP from the configuration reception component 1440 and is configured to switch the first BWP to the second BWP, where: the first bandwidth is switched to a second bandwidth, the first slot format is switched to a second slot format, or the first bandwidth is switched to the second bandwidth and the first slot format is switched to the second slot format, e.g., as described in connection with 1210. The communication manager 1432 further includes a determination component 1446 that receives input in the form of the configuration from the configuration reception component 1440 or the DCI from the DCI component 1444 and is configured to determine the second slot format to be a slot format of a band including the first BWP and the second BWP in response to: the configuration omitting an association of the second BWP to a dedicated slot format, and the configuration or downlink control information (DCI) indicating not to maintain the first slot format for the second BWP, e.g., as described in connection with 1212. The determination component 1446 is further configured to determine to maintain the first bandwidth for the second BWP in response to the configuration or DCI indicating a same BWP index as the first BWP, and determine to switch the first slot format to the second slot format in response to the configuration or DC indicating not to maintain the first slot format for the second BWP, where the second slot format is a slot format of a band including the first BWP and the second BWP in response to the determination, e.g., as described in connection with 1214.

The apparatus may include additional components that perform each of the blocks of the algorithm in the aforementioned flowcharts of FIGS. 11 and 12. As such, each block in the aforementioned flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for receiving, from a base station, a configuration of a first BWP and a second BWP, wherein the first BWP is associated with a first bandwidth and a first slot format dedicated for the first BWP; and means for switching the first BWP to the second BWP, wherein: the first bandwidth is switched to a second bandwidth, the first slot format is switched to a second slot format, or the first bandwidth is switched to the second bandwidth and the first slot format is switched to the second slot format.

In one configuration, the apparatus 1402, and in particular the cellular baseband processor 1404, may include means for receiving DCI from the base station, wherein the DCI indicates the second BWP for the switching, and the DCI further indicates whether to maintain the first slot format for the second BWP.

In one configuration, the apparatus 1402, and in particular the cellular baseband processor 1404, may include means for determining the second slot format to be a slot format of a band including the first BWP and the second BWP in response to: the configuration omitting an association of the second BWP to a dedicated slot format, and the configuration or downlink control information (DCI) indicating not to maintain the first slot format for the second BWP.

In one configuration, the apparatus 1402, and in particular the cellular baseband processor 1404, may include means for determining to maintain the first bandwidth for the second BWP in response to the configuration or downlink control information (DCI) indicating a same BWP index as the first BWP, and to switch the first slot format to the second slot format in response to the configuration or DCI indicating not to maintain the first slot format for the second BWP; wherein the second slot format is a slot format of a band including the first BWP and the second BWP in response to the determination.

In one configuration, the apparatus 1402, and in particular the cellular baseband processor 1404, may include means for receiving a RRC configuration, wherein the RRC configuration associates the first BWP with the second BWP, the RRC configuration includes a slot format switching behavior indicating whether to maintain the first slot format for the second BWP, and the first slot format is switched to the second slot format based on the RRC configuration.

In one configuration, the apparatus 1402, and in particular the cellular baseband processor 1404, may include means for receiving DCI from the base station, wherein the DCI indicates the second BWP for the switching, and the first slot format is switched to the second slot format based on the DCI and the slot format switching behavior of the RRC configuration.

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
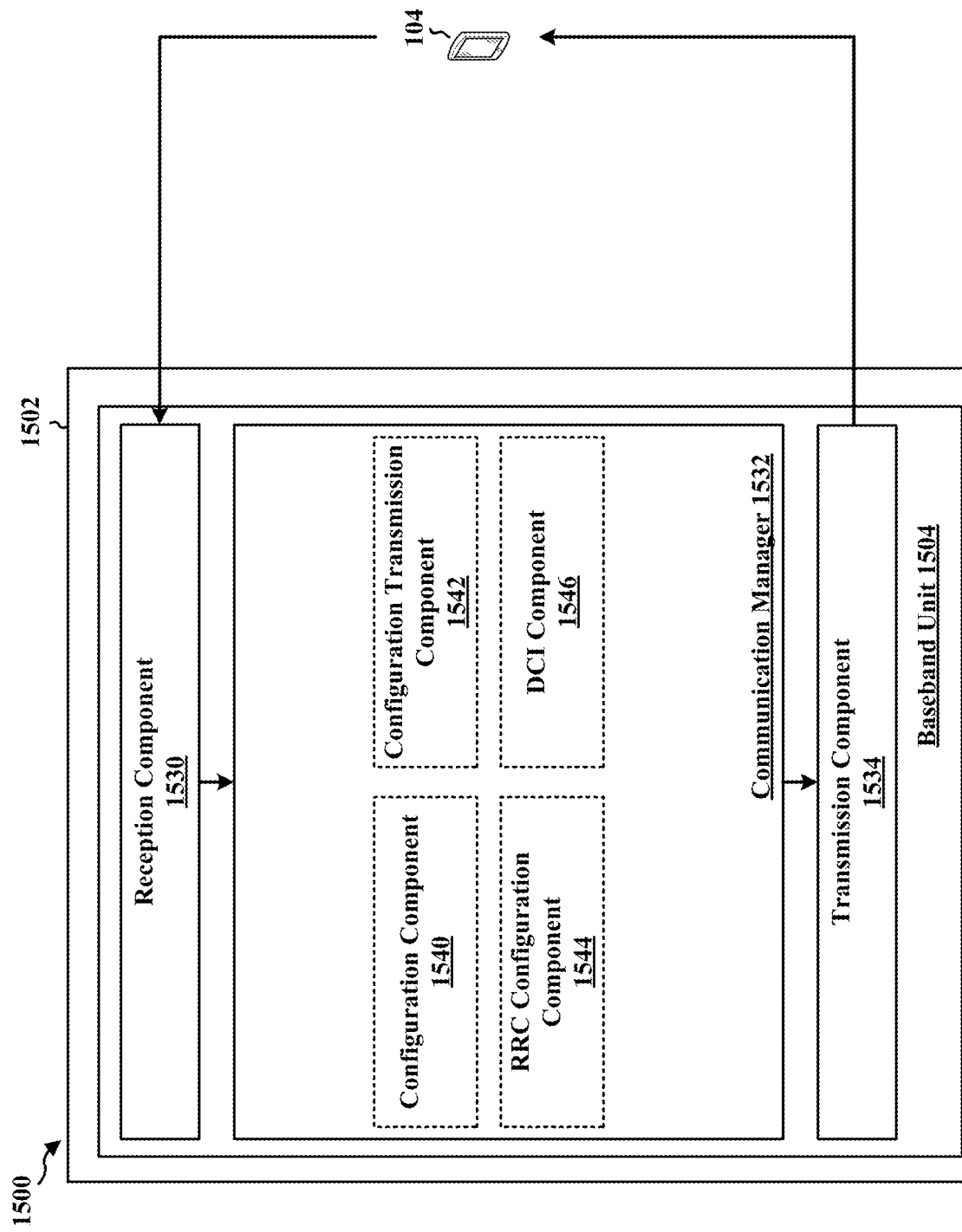
FIG. 15 is a diagram illustrating another example of a hardware implementation for another example apparatus.

FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes a configuration component 1540 that is configured to configure a first BWP and a second BWP, wherein the first BWP is associated with a first bandwidth and a first slot format dedicated for the first BWP, e.g., as described in connection 1302. The configuration component 1540 is further configured to configure the UE to maintain the first bandwidth for the second BWP in response to the configuration or DCI indicating a same BWP index as the first BWP, and to switch the first slot format to the second slot format in response to the configuration or DCI indicating not to maintain the first slot format for the second BWP, wherein the second slot format is a slot format of a band including the first BWP and the second BWP, e.g., as described in connection with 1304. The communication manager 1532 further includes a configuration transmission component 1542 that is configured to transmit, to a UE, a configuration to switch the first BWP to the second BWP, wherein the configuration indicates: the first bandwidth is to be switched to a second bandwidth, the first slot format is to be switched to a second slot format, or the first bandwidth is to be switched to the second bandwidth and the first slot format is to be switched to the second slot format, e.g., as described in connection with 1306. The communication manager 1532 further includes a RRC configuration component 1544 that is configured to transmit a RRC configuration, where the RRC configuration associates the first BWP with the second BWP, the RRC configuration includes a slot format switching behavior indicating whether to maintain the first slot format for the second BWP, and the first slot format is switched to the second slot format based on the RRC configuration, e.g., as described in connection with 1308. The communication manager 1532 further includes a DCI component 1546 that is configured to transmit DCI to the UE, where the DCI indicates the second BWP for the switching, and the first slot format is switched to the second slot format based on the DCI and the slot format switching behavior of the RRC configuration, e.g., as described in connection with 1310.

The apparatus may include additional components that perform each of the blocks of the algorithm in the aforementioned flowcharts of FIGS. 11 and 13. As such, each block in the aforementioned flowcharts of FIGS. 11 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for configuring a first bandwidth part (BWP) and a second BWP, wherein the first BWP is associated with a first bandwidth and a first slot format dedicated for the first BWP; and means for transmitting, to a user equipment (UE), a configuration to switch the first BWP to the second BWP, wherein the configuration indicates: the first bandwidth is to be switched to a second bandwidth, the first slot format is to be switched to a second slot format, or the first bandwidth is to be switched to the second bandwidth and the first slot format is to be switched to the second slot format.

In one configuration, the means for configuring may be further configured to configure the UE to maintain the first bandwidth for the second BWP in response to the configuration or DCI indicating a same BWP index as the first BWP, and to switch the first slot format to the second slot format in response to the configuration or DCI indicating not to maintain the first slot format for the second BWP, wherein the second slot format is a slot format of a band including the first BWP and the second BWP.

In one configuration, the apparatus 1502, and in particular the baseband unit 1504, may include means for transmitting a RRC configuration, wherein the RRC configuration associates the first BWP with the second BWP, the RRC configuration includes a slot format switching behavior indicating whether to maintain the first slot format for the second BWP, and the first slot format is switched to the second slot format based on the RRC configuration.

In one configuration, the apparatus 1502, and in particular the baseband unit 1504, may include means for transmitting DCI to the UE, wherein the DCI indicates the second BWP for the switching, and the first slot format is switched to the second slot format based on the DCI and the slot format switching behavior of the RRC configuration.

The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A. B, or C," "one or more of A, B, or C." "at least one of A, B. and C," "one or more of A, B, and C," and "A, B, C, or any combination thereof" include any combination of A, B, and/or C. and may include multiples of A, multiples of B, or multiples of C. Specifically, combinations such as "at least one of A, B. or C," "one or more of A, B. or C," "at least one of A, B, and C." "one or more of A, B, and C," and "A, B, C, or any combination thereof" may be A only, B only, C only, A and B. A and C, B and C. or A and B and C, where any such combinations may contain one or more member or members of A, B. or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving, from a base station, a configuration of a first bandwidth part (BWP) and a second BWP, wherein the first BWP is associated with a first bandwidth and a first slot format dedicated for the first BWP; and switching the first BWP to the second BWP, wherein: the first bandwidth is switched to a second bandwidth, the first slot format is switched to a second slot format, or the first bandwidth is switched to the second bandwidth and the first slot format is switched to the second slot format.

Example 2 is the method of Example 1, further comprising: receiving downlink control information (DCI) from the base station, wherein the DCI indicates the second BWP for the switching, and the DCI further indicates whether to maintain the first slot format for the second BWP.

Example 3 is the method of Example 2, wherein the first slot format is switched to the second slot format in response to the DCI.

Example 4 is the method of any of Examples 1 to 3, wherein the configuration is a radio resource control (RRC) reconfiguration, the RRC reconfiguration indicates the second BWP for the switching, and the RRC reconfiguration further indicates whether to maintain the first slot format for the second BWP.

Example 5 is the method of Example 4, wherein the first slot format is switched to the second slot format in response to the RRC reconfiguration.

Example 6 is the method of any of Examples 1 to 5, further comprising: determining the second slot format to be a slot format of a band including the first BWP and the second BWP in response to: the configuration omitting an association of the second BWP to a dedicated slot format, and the configuration or downlink control information (DCI) indicating not to maintain the first slot format for the second BWP.

Example 7 is the method of any of Examples 1 to 6, further comprising: determining to maintain the first bandwidth for the second BWP in response to the configuration or downlink control information (DCI) indicating a same BWP index as the first BWP, and to switch the first slot format to the second slot format in response to the configuration or DCI indicating not to maintain the first slot format for the second BWP; wherein the second slot format is a slot format of a band including the first BWP and the second BWP in response to the determination.

Example 8 is the method of any of Examples 1 to 7, further comprising: receiving a radio resource control (RRC) configuration, wherein the RRC configuration associates the first BWP with the second BWP, the RRC configuration includes a slot format switching behavior indicating whether to maintain the first slot format for the second BWP, and the first slot format is switched to the second slot format based on the RRC configuration.

Example 9 is the method of Example 8, wherein the first slot format is switched to the second slot format further in response to an expiration of a BWP inactivity timer.

Example 10 is the method of Examples 8 or 9, further comprising: receiving downlink control information (DCI) from the base station, wherein the DCI indicates the second BWP for the switching, and the first slot format is switched to the second slot format based on the DCI and the slot format switching behavior of the RRC configuration.

Example 11 is an apparatus for wireless communication, comprising: a processor; memory coupled with the processor: and instructions stored in the memory and operable, when executed by the processor, to cause the apparatus to: receive, from a base station, a configuration of a first bandwidth part (BWP) and a second BWP, wherein the first BWP is associated with a first bandwidth and a first slot format dedicated for the first BWP: and switch the first BWP to the second BWP, wherein: the first bandwidth is switched to a second bandwidth, the first slot format is switched to a second slot format, or the first bandwidth is switched to the second bandwidth and the first slot format is switched to the second slot format.

Example 12 is the apparatus of Example 11, wherein the instructions, when executed by the processor, further cause the apparatus to: receive downlink control information (DCI) from the base station, wherein the DCI indicates the second BWP for the switching, and the DCI further indicates whether to maintain the first slot format for the second BWP.

Example 13 is the apparatus of Examples 11 or 12, wherein the instructions, when executed by the processor, further cause the apparatus to: determine the second slot format to be a slot format of a band including the first BWP and the second BWP in response to: the configuration omitting an association of the second BWP to a dedicated slot format, and the configuration or downlink control information (DCI) indicating not to maintain the first slot format for the second BWP.

Example 14 is the apparatus of any of Examples 11 to 13, wherein the instructions, when executed by the processor, further cause the apparatus to: determine to maintain the first bandwidth for the second BWP in response to the configuration or downlink control information (DCI) indicating a same BWP index as the first BWP, and to switch the first slot format to the second slot format in response to the configuration or DCI indicating not to maintain the first slot format for the second BWP: wherein the second slot format is a slot format of a band including the first BWP and the second BWP in response to the determination.

Example 15 is the apparatus of any of Examples 11 to 14, wherein the instructions, when executed by the processor, further cause the apparatus to: receive a radio resource control (RRC) configuration, wherein the RRC configuration associates the first BWP with the second BWP, the RRC configuration includes a slot format switching behavior indicating whether to maintain the first slot format for the second BWP, and the first slot format is switched to the second slot format based on the RRC configuration.

Example 16 is the apparatus of Example 15, wherein the instructions, when executed by the processor, further cause the apparatus to: receive downlink control information (DCI) from the base station, wherein the DCI indicates the second BWP for the switching, and the first slot format is switched to the second slot format based on the DCI and the slot format switching behavior of the RRC configuration.

Example 17 is a method of wireless communication at a base station, comprising: configuring a first bandwidth part (BWP) and a second BWP, wherein the first BWP is associated with a first bandwidth and a first slot format dedicated for the first BWP; and transmitting, to a user equipment (UE), a configuration to switch the first BWP to the second BWP, wherein the configuration indicates: the first bandwidth is to be switched to a second bandwidth, the first slot format is to be switched to a second slot format, or the first bandwidth is to be switched to the second bandwidth and the first slot format is to be switched to the second slot format.

Example 18 is the method of Example 17, wherein the configuration is downlink control information (DCI), the DCI indicates the second BWP for the switching, and the DCI further indicates whether to maintain the first slot format for the second BWP.

Example 19 is the method of Example 18, wherein the first slot format is switched to the second slot format in response to the DCI.

Example 20 is the method of any of Examples 17 to 19, wherein the configuration is a radio resource control (RRC) reconfiguration, the RRC reconfiguration indicates the second BWP for the switching, and the RRC reconfiguration further indicates whether to maintain the first slot format for the second BWP.

Example 21 is the method of Example 20, wherein the first slot format is switched to the second slot format in response to the RRC reconfiguration.

Example 22 is the method of any of Examples 17 to 21, wherein the second slot format is a slot format of a band including the first BWP and the second BWP in response to: the configuration omitting an association of the second BWP to a dedicated slot format, and the configuration or downlink control information (DCI) indicating not to maintain the first slot format for the second BWP.

Example 23 is the method of any of Examples 17 to 22, further comprising: configuring the UE to maintain the first bandwidth for the second BWP in response to the configuration or downlink control information (DCI) indicating a same BWP index as the first BWP, and to switch the first slot format to the second slot format in response to the configuration or DCI indicating not to maintain the first slot format for the second BWP: wherein the second slot format is a slot format of a band including the first BWP and the second BWP.

Example 24 is the method of any of Examples 17 to 23, further comprising: transmitting a radio resource control (RRC) configuration, wherein the RRC configuration associates the first BWP with the second BWP, the RRC configuration includes a slot format switching behavior indicating whether to maintain the first slot format for the second BWP, and the first slot format is switched to the second slot format based on the RRC configuration.

Example 25 is the method of Example 24, wherein the first slot format is switched to the second slot format further in response to an expiration of a BWP inactivity timer.

Example 26 is the method of Examples 24 or 25, further comprising: transmitting downlink control information (DCI) to the UE, wherein the DCI indicates the second BWP for the switching, and the first slot format is switched to the second slot format based on the DCI and the slot format switching behavior of the RRC configuration.

Example 27 is an apparatus for wireless communication, comprising: a processor: memory coupled with the processor: and instructions stored in the memory and operable, when executed by the processor, to cause the apparatus to: configure a first bandwidth part (BWP) and a second BWP, wherein the first BWP is associated with a first bandwidth and a first slot format dedicated for the first BWP: and transmit, to a user equipment (UE), a configuration to switch the first BWP to the second BWP, wherein the configuration indicates: the first bandwidth is to be switched to a second bandwidth, the first slot format is to be switched to a second slot format, or the first bandwidth is to be switched to the second bandwidth and the first slot format is to be switched to the second slot format.

Example 28 is the apparatus of Example 27, wherein the instructions, when executed by the processor, further cause the apparatus to: configure the UE to maintain the first bandwidth for the second BWP in response to the configuration or downlink control information (DCI) indicating a same BWP index as the first BWP, and to switch the first slot format to the second slot format in response to the configuration or DCI indicating not to maintain the first slot format for the second BWP; wherein the second slot format is a slot format of a band including the first BWP and the second BWP.

Example 29 is the apparatus of Examples 27 or 28, wherein the instructions, when executed by the processor, further cause the apparatus to: transmit a radio resource control (RRC) configuration, wherein the RRC configuration associates the first BWP with the second BWP, the RRC configuration includes a slot format switching behavior indicating whether to maintain the first slot format for the second BWP, and the first slot format is switched to the second slot format based on the RRC configuration.

Example 30 is the apparatus of Example 29, wherein the instructions, when executed by the processor, further cause the apparatus to: transmit downlink control information (DCI) to the UE, wherein the DCI indicates the second BWP for the switching, and the first slot format is switched to the second slot format based on the DCI and the slot format switching behavior of the RRC configuration.

What is claimed is:

1. A method of wireless communication at a user equipment (UE), comprising:
  receiving, from a base station, a configuration of a first bandwidth part (BWP) and a second BWP, wherein the first BWP is associated with a first bandwidth and a first slot format dedicated for the first BWP;
  receiving downlink control information (DCI) from the base station; and
  switching the first BWP to the second BWP, wherein:
    the first bandwidth is switched to a second bandwidth, the first slot format is switched to a second slot format, or
    the first bandwidth is switched to the second bandwidth and the first slot format is switched to the second slot format,
  and wherein:
    the DCI indicates the second BWP for the switching, and the DCI further indicates whether to maintain the first slot format for the second BWP, or
    the configuration is a radio resource control (RRC) reconfiguration that indicates the second BWP for the switching, and the RRC reconfiguration further indicates whether to maintain the first slot format for the second BWP.

2. The method of claim 1, wherein the first slot format is switched to the second slot format in response to the DCI.

3. The method of claim 1, wherein the first slot format is switched to the second slot format in response to the RRC reconfiguration.

4. The method of claim 1, further comprising:
  determining the second slot format to be a slot format of a band including the first BWP and the second BWP in response to:
    the configuration omitting an association of the second BWP to a dedicated slot format, and
    the configuration or the DCI indicating not to maintain the first slot format for the second BWP.

5. The method of claim 1, further comprising:
  determining to maintain the first bandwidth for the second BWP in response to the configuration or the DCI indicating a same BWP index as the first BWP, and to switch the first slot format to the second slot format in response to the configuration or the DCI indicating not to maintain the first slot format for the second BWP;
  wherein the second slot format is a slot format of a band including the first BWP and the second BWP in response to the determination.

6. The method of claim 1, further comprising:
receiving a radio resource control (RRC) configuration, wherein the RRC configuration associates the first BWP with the second BWP, the RRC configuration includes a slot format switching behavior indicating whether to maintain the first slot format for the second BWP, and the first slot format is switched to the second slot format based on the RRC configuration.

7. The method of claim 6, wherein the first slot format is switched to the second slot format further in response to an expiration of a BWP inactivity timer.

8. The method of claim 6,
wherein the DCI indicates the second BWP for the switching, and the first slot format is switched to the second slot format based on the DCI and the slot format switching behavior of the RRC configuration.

9. An apparatus for wireless communication, comprising:
one or more processors;
one or more memories each coupled with at least one of the one or more processors; and
instructions stored in the one or more memories, individually or in combination, and operable, when executed by the one or more processors, individually or in combination, to cause the apparatus to:
receive, from a base station, a configuration of a first bandwidth part (BWP) and a second BWP, wherein the first BWP is associated with a first bandwidth and a first slot format dedicated for the first BWP;
receive downlink control information (DCI) from the base station; and
switch the first BWP to the second BWP, wherein:
the first bandwidth is switched to a second bandwidth,
the first slot format is switched to a second slot format, or
the first bandwidth is switched to the second bandwidth and the first slot format is switched to the second slot format,
and wherein:
the DCI indicates the second BWP for the switching, and the DCI further indicates whether to maintain the first slot format for the second BWP, or
the configuration is a radio resource control (RRC) reconfiguration that indicates the second BWP for the switching, and the RRC reconfiguration further indicates whether to maintain the first slot format for the second BWP.

10. The apparatus of claim 9, wherein the instructions, when executed by the one or more processors, individually or in combination, further cause the apparatus to:
determine the second slot format to be a slot format of a band including the first BWP and the second BWP in response to:
the configuration omitting an association of the second BWP to a dedicated slot format, and
the configuration or the DCI indicating not to maintain the first slot format for the second BWP.

11. The apparatus of claim 9, wherein the instructions, when executed by the one or more processors, individually or in combination, further cause the apparatus to:
determine to maintain the first bandwidth for the second BWP in response to the configuration or the DCI indicating a same BWP index as the first BWP, and to switch the first slot format to the second slot format in response to the configuration or the DCI indicating not to maintain the first slot format for the second BWP;
wherein the second slot format is a slot format of a band including the first BWP and the second BWP in response to the determination.

12. The apparatus of claim 9, wherein the instructions, when executed by the one or more processors, individually or in combination, further cause the apparatus to:
receive a radio resource control (RRC) configuration, wherein the RRC configuration associates the first BWP with the second BWP, the RRC configuration includes a slot format switching behavior indicating whether to maintain the first slot format for the second BWP, and the first slot format is switched to the second slot format based on the RRC configuration.

13. The apparatus of claim 12,
wherein the DCI indicates the second BWP for the switching, and the first slot format is switched to the second slot format based on the DCI and the slot format switching behavior of the RRC configuration.

14. A method of wireless communication at a base station, comprising:
configuring a first bandwidth part (BWP) and a second BWP, wherein the first BWP is associated with a first bandwidth and a first slot format dedicated for the first BWP; and
transmitting, to a user equipment (UE), a configuration to switch the first BWP to the second BWP, wherein the configuration indicates:
the first bandwidth is to be switched to a second bandwidth,
the first slot format is to be switched to a second slot format, or
the first bandwidth is to be switched to the second bandwidth and the first slot format is to be switched to the second slot format,
and wherein:
the configuration is downlink control information (DCI) that indicates the second BWP for the switching, and the DCI further indicates whether to maintain the first slot format for the second BWP, or
the configuration is a radio resource control (RRC) reconfiguration that indicates the second BWP for the switching, and the RRC reconfiguration further indicates whether to maintain the first slot format for the second BWP.

15. The method of claim 14, wherein the first slot format is switched to the second slot format in response to the DCI.

16. The method of claim 14, wherein the first slot format is switched to the second slot format in response to the RRC reconfiguration.

17. The method of claim 14, wherein the second slot format is a slot format of a band including the first BWP and the second BWP in response to:
the configuration omitting an association of the second BWP to a dedicated slot format, and
the configuration or the DCI indicating not to maintain the first slot format for the second BWP.

18. The method of claim 14, further comprising:
configuring the UE to maintain the first bandwidth for the second BWP in response to the configuration or the DCI indicating a same BWP index as the first BWP, and to switch the first slot format to the second slot format in response to the configuration or the DCI indicating not to maintain the first slot format for the second BWP;
wherein the second slot format is a slot format of a band including the first BWP and the second BWP.

19. The method of claim 14, further comprising:
transmitting a radio resource control (RRC) configuration, wherein the RRC configuration associates the first BWP with the second BWP, the RRC configuration includes a slot format switching behavior indicating whether to maintain the first slot format for the second BWP, and the first slot format is switched to the second slot format based on the RRC configuration.

20. The method of claim 19, wherein the first slot format is switched to the second slot format further in response to an expiration of a BWP inactivity timer.

21. The method of claim 19,
wherein the DCI indicates the second BWP for the switching, and the first slot format is switched to the second slot format based on the DCI and the slot format switching behavior of the RRC configuration.

22. An apparatus for wireless communication, comprising:
one or more processors;
one or more memories each coupled with at least one of the one or more processors; and
instructions stored in the one or more memories, individually or in combination, and operable, when executed by the one or more processors, individually or in combination, to cause the apparatus to:
configure a first bandwidth pant (BWP) and a second BWP, wherein the first BWP is associated with a first bandwidth and a first slot format dedicated for the first BWP; and
transmit, to a user equipment (UE), a configuration to switch the first BWP to the second BWP, wherein the configuration indicates:
the first bandwidth is to be switched to a second bandwidth,
the first slot format is to be switched to a second slot format, or
the first bandwidth is to be switched to the second bandwidth and the first slot format is to be switched to the second slot format,
and wherein:
the configuration is downlink control information (DCI) that indicates the second BWP for the switching, and the DCI further indicates whether to maintain the first slot format for the second BWP, or
the configuration is a radio resource control (RRC) reconfiguration that indicates the second BWP for the switching, and the RRC reconfiguration further indicates whether to maintain the first slot format for the second BWP.

23. The apparatus of claim 22, wherein the instructions, when executed by the one or more processors, individually or in combination, further cause the apparatus to:
configure the UE to maintain the first bandwidth for the second BWP in response to the configuration or the DCI indicating a same BWP index as the first BWP, and to switch the first slot format to the second slot format in response to the configuration or the DCI indicating not to maintain the first slot format for the second BWP;
wherein the second slot format is a slot format of a band including the first BWP and the second BWP.

24. The apparatus of claim 22, wherein the instructions, when executed by the one or more processors, individually or in combination, further cause the apparatus to:
transmit a radio resource control (RRC) configuration, wherein the RRC configuration associates the first BWP with the second BWP, the RRC configuration includes a slot format switching behavior indicating whether to maintain the first slot format for the second BWP, and the first slot format is switched to the second slot format based on the RRC configuration.

25. The apparatus of claim 24,
wherein the DCI indicates the second BWP for the switching, and the first slot format is switched to the second slot format based on the DCI and the slot format switching behavior of the RRC configuration.

* * * * *